US011726580B2

(12) United States Patent
Downey

(10) Patent No.: US 11,726,580 B2
(45) Date of Patent: *Aug. 15, 2023

(54) NON-STANDARD KEYBOARD INPUT SYSTEM

(71) Applicant: John Walter Downey, Fairfax, VA (US)

(72) Inventor: John Walter Downey, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,868

(22) Filed: Sep. 4, 2022

(65) Prior Publication Data

US 2022/0413624 A1  Dec. 29, 2022

Related U.S. Application Data

(63) Continuation of application No. 17/461,767, filed on Aug. 30, 2021, now Pat. No. 11,435,835, which is a continuation of application No. 16/805,892, filed on Mar. 2, 2020, now Pat. No. 11,106,288.

(51) Int. Cl.
| | | |
|---|---|---|
| *G06F 5/00* | (2006.01) | |
| *G06F 3/023* | (2006.01) | |
| *G06F 3/04886* | (2022.01) | |
| *H04N 21/431* | (2011.01) | |
| *H04N 21/478* | (2011.01) | |
| *H04N 21/472* | (2011.01) | |
| *G06F 3/02* | (2006.01) | |

(52) U.S. Cl.
CPC .......... *G06F 3/0236* (2013.01); *G06F 3/0237* (2013.01); *G06F 3/04886* (2013.01); *G06F 3/0219* (2013.01); *G06F 2203/04809* (2013.01); *H04N 21/4312* (2013.01); *H04N 21/472* (2013.01); *H04N 21/478* (2013.01)

(58) Field of Classification Search
CPC .. G06F 3/0236; G06F 3/0237; G06F 3/04886; G06F 3/0219; G06F 2203/04809; G06F 3/04806; H04N 21/4312; H04N 21/472; H04N 21/478
See application file for complete search history.

(56) References Cited

U.S. PATENT DOCUMENTS 11,106,288 B1 * 8/2021 Downey ............... G06F 3/0236
11,435,835 B2 * 9/2022 Downey ............... G06F 3/0237

* cited by examiner

*Primary Examiner* — Adam J Snyder
(74) *Attorney, Agent, or Firm* — The Law Firm of AQ Basit

(57) ABSTRACT

An electronic communications method includes receiving, by a device, electronic information. The electronic communications method further includes receiving, by the device, additional electronic information. A time period between receiving the electronic information and the additional electronic information is less than another time period between receiving the electronic information and the additional electronic information by using a standard keyboard.

20 Claims, 26 Drawing Sheets

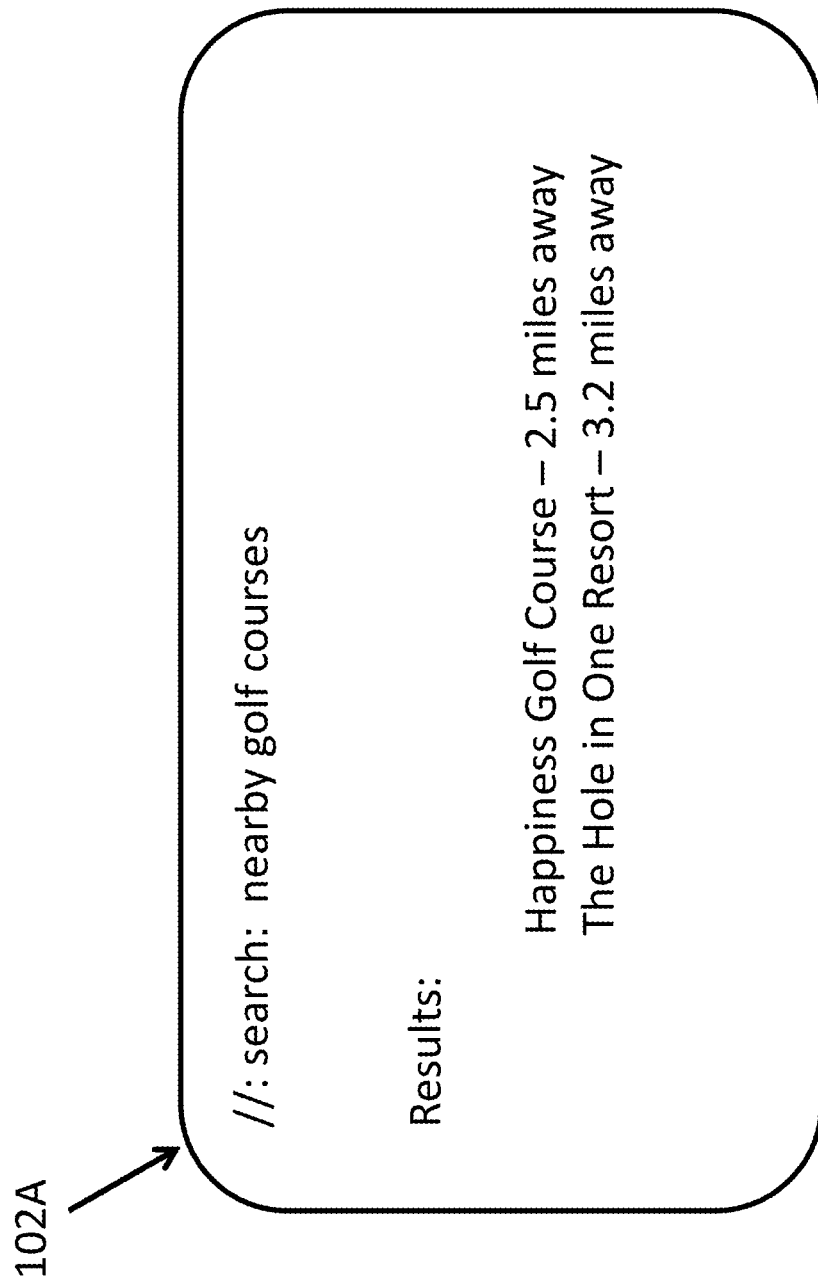

| Targets | Value | Targets | Un-shifted Value | Shifted Value | Targets | Un-shifted Value | Shifted Value | Targets | Un-shifted Value | Shifted Value |
|---|---|---|---|---|---|---|---|---|---|---|
| 2,1-1,1 | ! | 1,1 | ` | | 2,1 | : | | 3,1 | ' | |
| 2,2-1,2 | @ | 1,2-1,1 | q | ~ | 2,2-2,1 | a | < | 3,2-3,1 | z | ` |
| 2,3-1,3 | # | 1,2 | w | | 2,2 | s | | 3,2 | x | ' |
| 2,4-1,4 | $ | 1,2-1,3 | e | | 2,2-2,3 | d | > | 3,2-3,3 | c | \ |
| 2,5-1,5 | % | 1,4-1,3 | r | { | 2,4-2,3 | f | ( | 3,4-3,3 | v | [ |
| 2,6-1,6 | ^ | 1,4 | t | | 2,4 | g | | 3,4 | b | ] |
| 2,7-1,7 | & | 1,4-1,5 | y | } | 2,4-2,5 | h | ) | 3,4-3,5 | n | 1 |
| 2,1-3,1 | * | 1,6-1,5 | u | 7 | 2,6-2,5 | j | 4 | 3,6-3,5 | m | 2 |
| 2,2-3,2 | ( | 1,6 | i | 8 | 2,6 | k | 5 | 3,6 | , | |
| 2,3-3,3 | ) | 1,6-1,7 | o | 9 | 2,6-2,7 | l | 6 | 3,6-3,7 | . | 4 |
| 2,4-3,4 | _ | 1,7 | p | | 2,7 | ; | | 3,7 | ? | |
| 2,5-3,5 | + | | | | | | | | | |
| 2,6-3,6 | 0 | | | | | | | | | |
| 2,7-3,7 | / | | | | | | | | | |

FIG. 19

NON-STANDARD KEYBOARD INPUT SYSTEM

BACKGROUND

A user may use various forms of electronic inputs to enter information into a computing device that can be then understood by the computing device for processing, transmission or display of the inputted information. While there are numerous systems for inputting electronic information, there are no known systems that efficiently receive electronic information reduce the amount of time between inputs of electronic information. Furthermore, there are no known systems that allow for automaticity: a device that supports text and command input and allow for simultaneous device interaction for other social or work activities.

BRIEF DESCRIPTION OF DRAWINGS

FIGS. 1A-1C is a diagram of an example environment in which systems and/or methods described herein may be implemented;

FIG. 19 is an example database;

DETAILED DESCRIPTION OF PREFERRED EMBODIMENTS

Figure 1A:
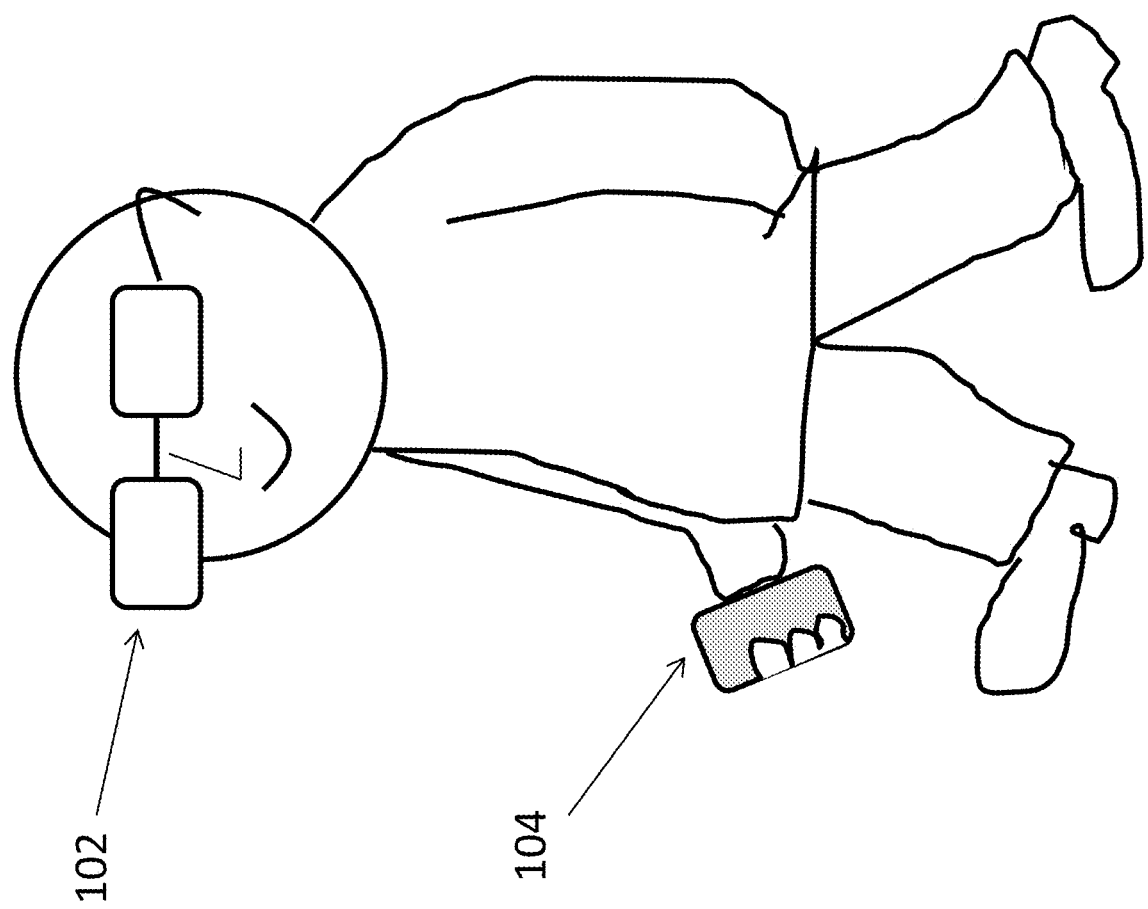

The following detailed description refers to the accompanying drawings. The same reference numbers in different drawings may identify the same or similar elements.

Systems, devices, and/or methods described herein may allow for a user of a user device (e.g., laptop, smartphone, headset, remote control, etc.) to input electronic information in a manner that reduces the amount of time between different inputs of electronic information. Furthermore, the systems, devices, and/or methods described herein may reduce the physical size of various mechanical and/or electrical features. For example, there may be a laptop that, rather than having a QWERTY-style keyboard, has an alternative keyboard described in one or more examples associated with one or more of the figures described herein. A user may then use this alternative keyboard to enter electronic information into the laptop within less time than if the user were to enter the same electronic information via a standard keyboard such as a QWERTY-style keyboard (e.g., which has a row of letters that begin with Q, W, E, R, T, and Y and have another row which has a row of letter that begin with A, S, D, and F, and an additional row which may have a row of letters that begin with Z, X, C, and V). In other languages, the standard keyboard may have their own row of letters or phonetics that follows a QWERTY-style keyboard in that language and/or have their own alphabet printed onto a QWERTY-style keyboard.

In embodiments, the alternative keyboard (hereinafter referred to as the electronic input system) may be physically sized to be used on an input device that can electronically communicate (wire or wirelessly) with a user device. In embodiments, the user device can be a television, a laptop, a tablet, a headset, headphones, a smartphone, or any other device that can receive electronic input information. In embodiments, the electronic input system may have one or more surface areas. In embodiments, each surface area may be further subdivided into defined areas that are associated with inputting particular types of electronic information. For example, a portion of the electronic input system may allow for one or more different types of electronic information. In a non-limiting example, a portion of the electronic input system may be configured to receive electronic inputs for the letter "a," "x" and "v." In another non-limiting example, a portion of the electronic input system may be configured to receive electronic inputs for the symbols "&" and "@." In embodiments, the electronic input system may have information printed on the surface of the electronic input system that indicates which defined areas are associated with which types of information that may be inputted. In alternate embodiments, the electronic input system may have an electronic touch screen display that has information displayed that indicates which defined areas of the electronic touch screen are associated with different types of information. In embodiments, the type of information for input associated with a particular area of the display screen may be changed and associated with other types of information for input. In a non-limiting example, an area of the electronic touch screen may be configured to receive electronic inputs for "1," "2," and "3." In this non-limiting example, a particular swipe or other touch command changes the information displayed on the electronic touch screen and is now configured to receive electronic inputs for "a," "c," and "i." Also, in embodiments, changing the position of the electronic input position may result in how particular electronic information is inputted. In embodiments, areas of the electronic touch screen may associated with different types of information based on patterns of previous electronic inputs. In embodiments, the one or more examples described use a target touch surface that tactually rather than visually, provides for distraction free texting and command inputs. As such, the tactile feature of the device results in touch targets (e.g., buttons on a particular type of keypad) to be closer together than with keyboards and other input devices that require visual interaction. As such, a device may be reduced in size and can be further used in applications that allow for the device to be placed in a pocket, worn on a wrist, or integrated into a controller or any other hand held device.

Accordingly, the electronic input system may provide one or more electronic processes that (1) receiving multiple types of electronic information within a defined area of the electronic input system, (2) has a physical area that is less than other input systems associated with a user device, and (3) reduces the amount of time between inputs of different types of electronic information. Accordingly, an electronic input system allows for the interaction with an electronic device to be an automatized activity, thereby allowing the simultaneous performance of another task. Thus, a user of the electronic input system can conduct inputting text or issuing commands on such a device without interrupting another activity. Thus, the electronic input system allows for an automatized activity that allows the user to perform tasks without interference with conducting low level tasks (e.g., entering data onto a keypad). As such, the device is designed to be operated by touch with one hand, support both text and command input and to be small enough to be conveniently carried so as to be always available.

Figure 1B:
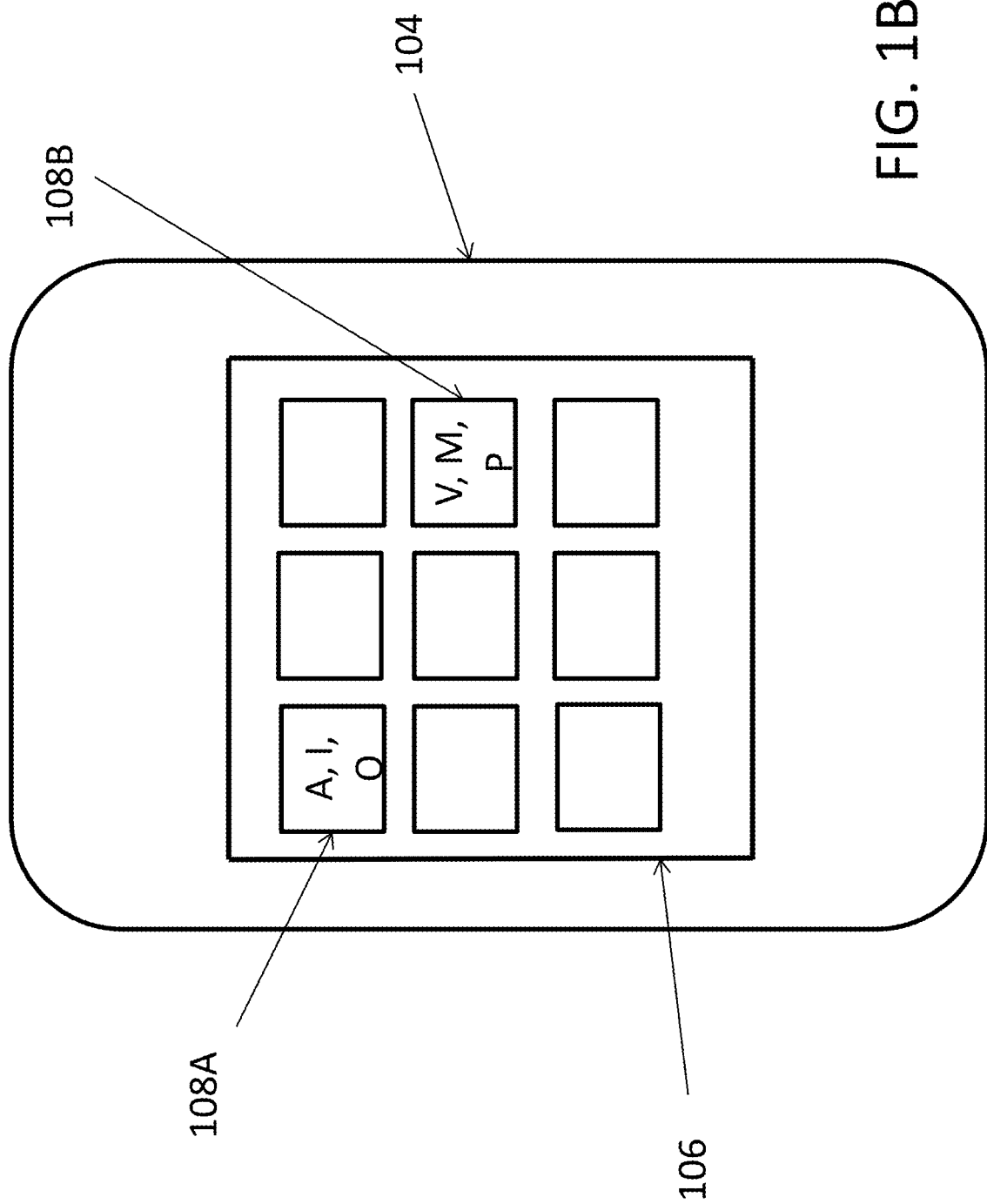

FIGS. 1A to 1C show an example shows an example environment describing an electronic input system. As shown in FIG. 1A, a person is walking with the person wearing headset 102 (e.g., glasses, goggles, etc.) and also holding input device 104. In embodiments, input device 104 may be an electronic input system. The person is hold input device 104 and may, while walking, enter information into input device 104. FIG. 1B describes input device 104 in further detail. As shown in FIG. 1B, input device 104 has area 106 which is further delineated into different regions with each region allowing for input of particular information. As shown in FIG. 1B, one of those regions is 108A and another region is 108B. In embodiments, region 108A may allow the person to input "A," "I," or "O" at any given time and region 108B may allow the person to input "V," "M," or "P" at any given time. In this non-limiting example, the person may, while not looking at input device 104, enter information that is then wirelessly communicate with headset 102. As shown in FIG. 1C, the person enters a search request for "nearby golf courses" by using input device 104. Accordingly, headset 102 electronically communicates with other computing devices and receives electronic information ("Happiness Golf Course" and "The Hole in One Resort) which are then displayed one of the lens areas of headset 104. Accordingly, a person may use an electronic input system, such as input device 104, to enter information without looking at the electronic input system and doing so within less time than if the person was looking at the electronic input system. dimensional image that is electronically displayed on the user device screen. As such, the electronic input system allows for a user to increase the amount of time for conducting other activities, such as other electronic communications and inputs.

Figure 2:
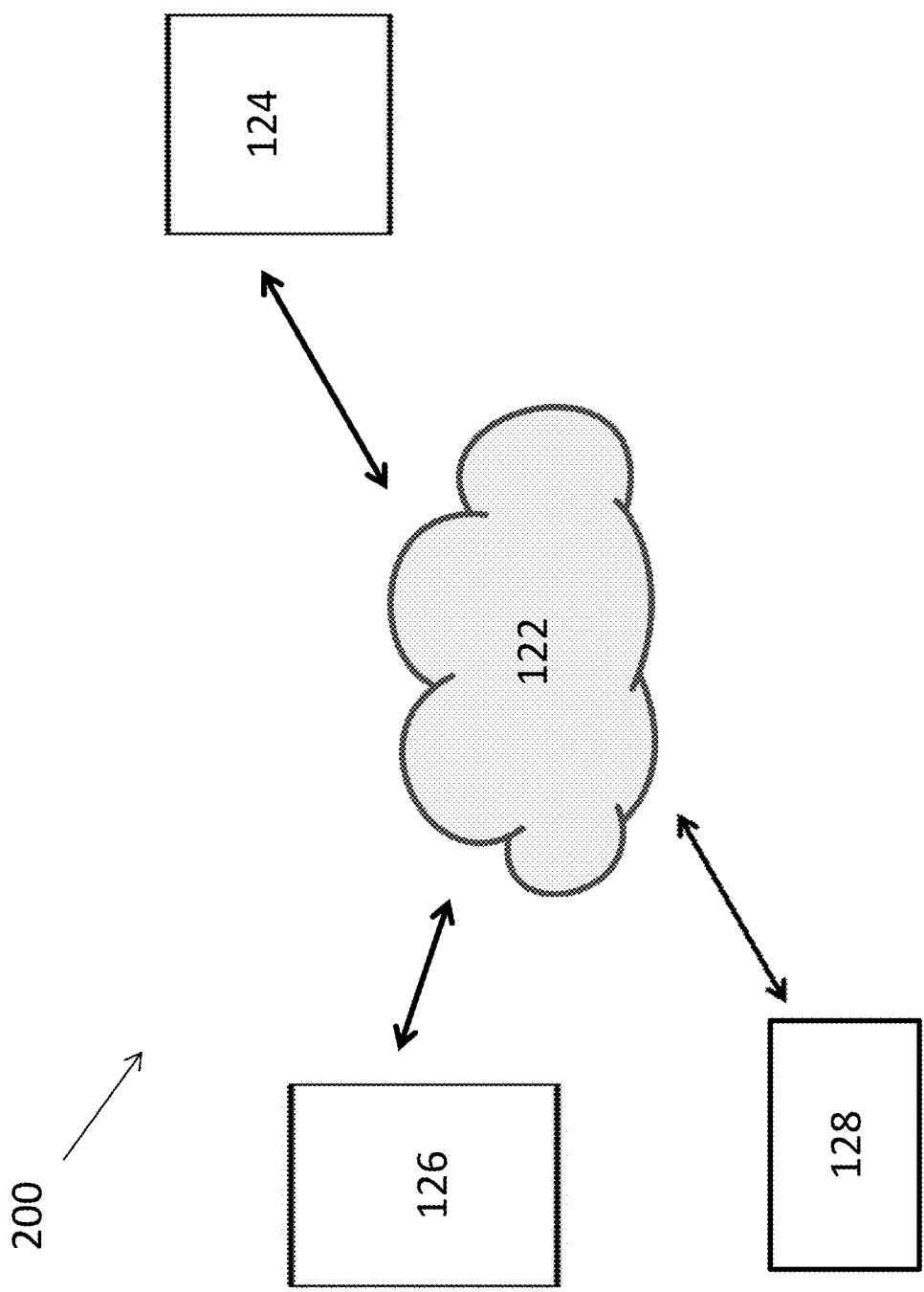
FIG. 2 is a diagram of a network environment.

FIG. 2 is a diagram of example environment 200 in which systems, devices, and/or methods described herein may be implemented. FIG. 2 shows network 122, user device 124, input device 126, and analysis server 128. Network 122 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks.

Additionally, or alternatively, network 122 may include a cellular network, a public land mobile network (PLMN), a second generation (2G) network, a third generation (3G) network, a fourth generation (4G) network, a fifth generation (5G) network, and/or another network. In embodiments, network 122 may allow for devices describe in any of the figures to electronically communicate (e.g., using emails, electronic signals, URL links, web links, electronic bits, fiber optic signals, wireless signals, wired signals, etc.) with each other so as to send and receive various types of electronic communications.

User device 124 may include any computation or communications device that is capable of communicating with a network (e.g., network 122). For example, user device 124 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, a virtual reality (VR) headset or device, a augmented reality (AR) headset or device, or another type of computation or communications device.

User device 124 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 124. User device 124 may have a touch screen and/or a keyboard that allows a user to electronically interact with an electronic application. In embodiments, a user may swipe, press, or touch user device 124 in such a manner that one or more electronic actions will be initiated by user device 124 via an electronic application.

User device 124 may include a variety of applications, such as, for example, an image generation application, an e-mail application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Input device 126 may interact with user device 124 by receiving user inputs which are then electronically sent to user device 124. In embodiments, input device 126 may be a part of user device 124. In embodiments, the information inputted into input device 126 may be displayed by user device 124. In embodiments, information inputted into input device 126 may electronically communicate with user device 124 via wireless and/or wire communication systems. In embodiments, the information may be analyzed by user device 124 and used by user device 124 to conduct additional electronic activities (e.g., conducting searches via a search engine, conducting searches for geographic information, etc.). In embodiments, input device 126 may have one or more areas that receive particular types of input information. In embodiments, the one or more areas may be physically constructed of a material (e.g., plastic, metal, composite material, etc.) that permits information printed on the one or more areas. In embodiments, input device 126 may have one or areas that have physical borders that allow a user (by touch) to differentiate one area from another. In embodiments, input device 126 may have areas which are touchscreens that allow for users to input electronic information. In embodiments, the touchscreens may have physical borders that differentiate one touchscreen area from another touchscreen area. In embodiments, the type of information that can be displayed on the touchscreen may be changed by a user of input device 126. In embodiments, input device 126 may be a separate device from user device 124 or may be a part of input device 126. In alternate embodiments, portions of input device 126 may be touchscreen and other portions may be constructed of a material with information printed on the material.

Analysis server 128 may include one or more computational or communication devices that gather, process, store, and/or provide information relating to one or more web pages, electronic pages, and/or images associated with input device 126. In embodiments, analysis server 128 may use information inputted into input device 126 to change how particular information can be inputted into input device 126 based on a user's interaction with input device 126. In embodiments, analysis server 128 may determine, based on received information to input device 126, that a particular area, based on its location on input device 126, should include a different type of accepted input from the user that reduces the amount of interval time that input device 126 receives between different inputs. In embodiments, analysis server 128 may be a part of input device 126 and/or user device 124.

Figure 3:
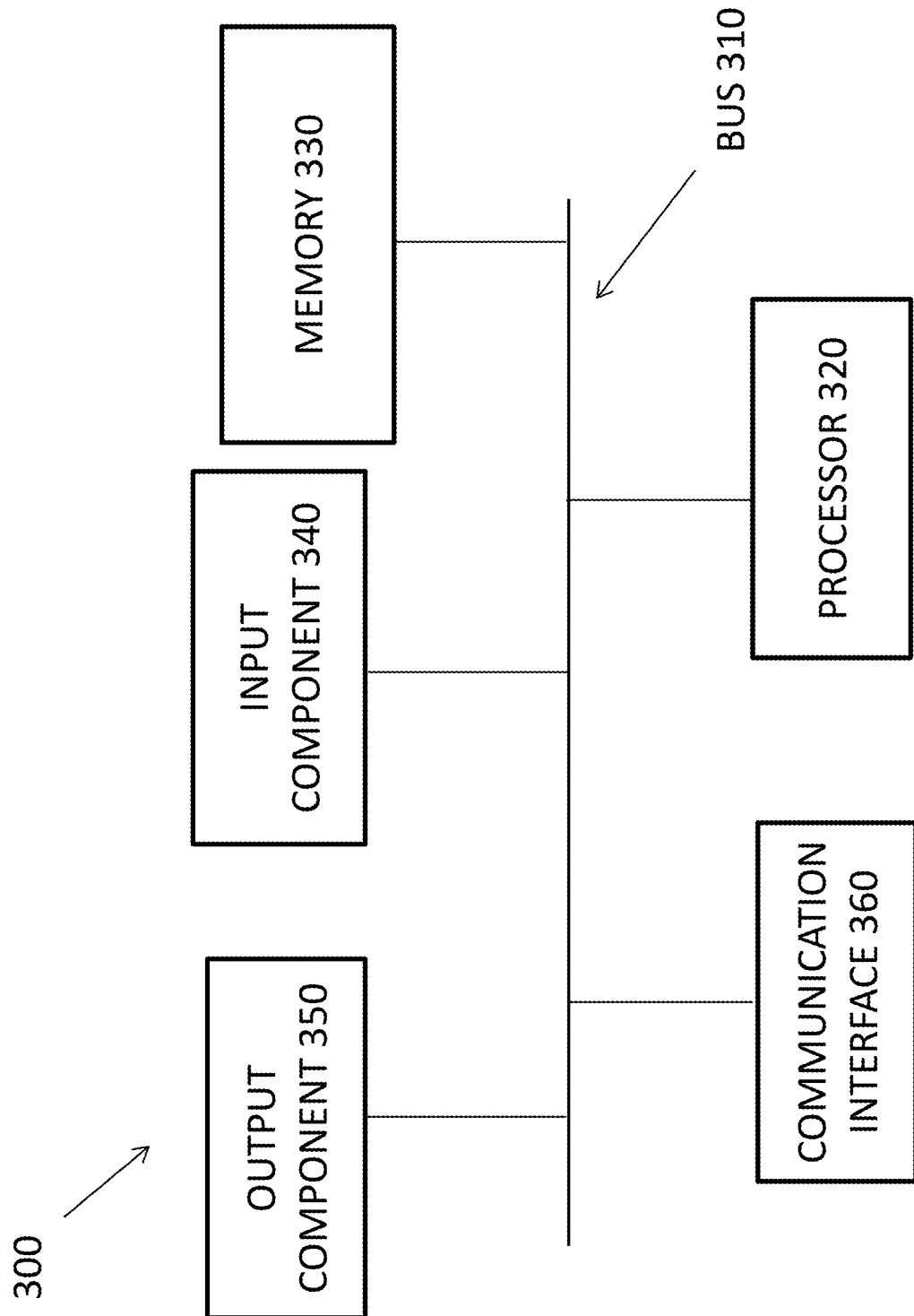
FIG. 3 is a diagram of an example computing device.

FIG. 3 is a diagram of example components of a device 300. Device 300 may correspond to user device 124, input device 126, and/or analysis server 128. Alternatively, or additionally, user device 124, input device 125, and/or analysis server 128 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320. Input component 340 may include a mechanism that permits a user to input information to device 300, such as a keyboard, a keypad, a button, a switch, voice command, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like. In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 122.

As will be described in detail below, device 300 may perform certain operations. Device 300 may perform these operations in response to processor 320 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
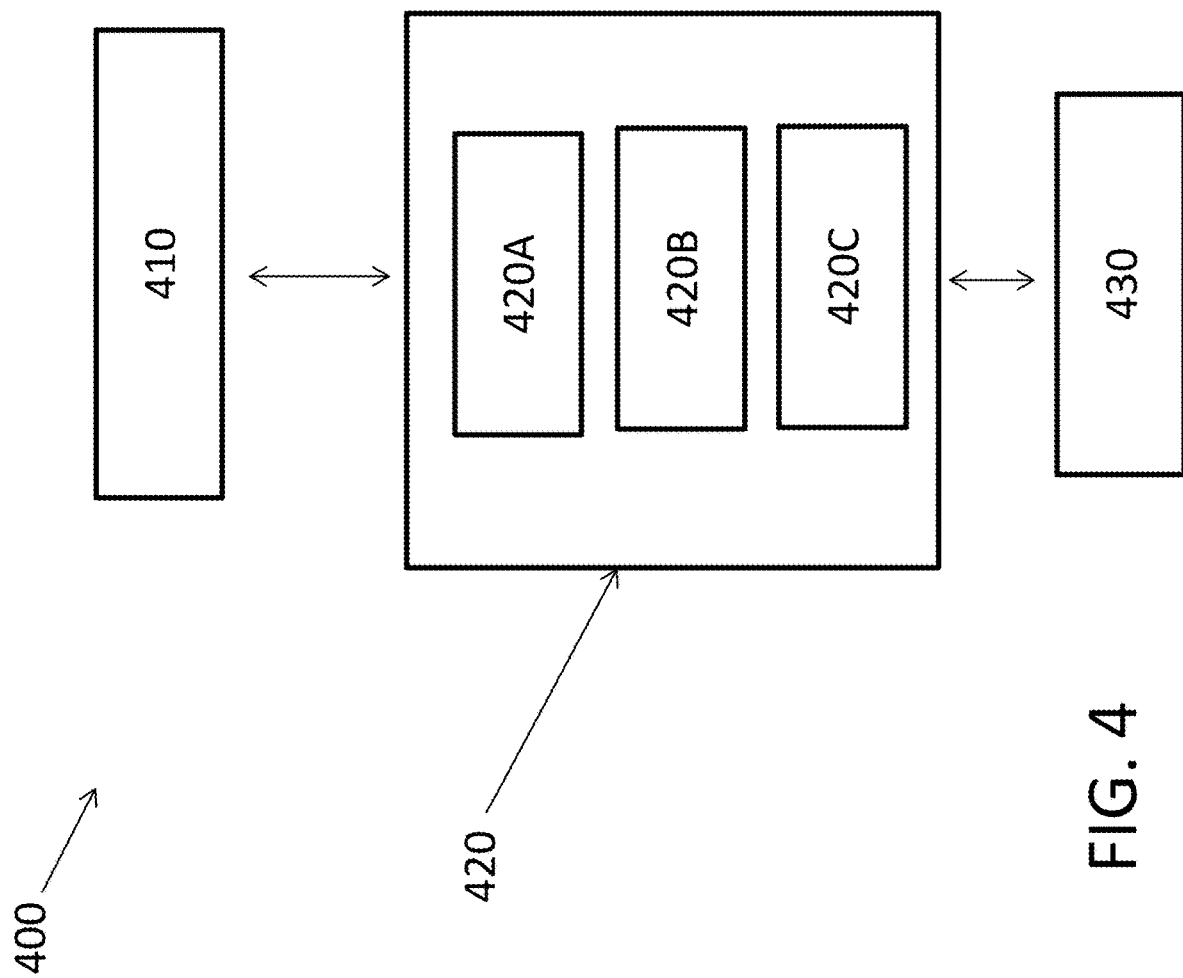
FIG. 4 is an diagram of an example computing device.

FIG. 4 is a diagram of example components of a device 400. Device 400 may correspond to input device 126 and/or user device 124. As shown in FIG. 4, device 400 includes surface 410, microcontroller 420, and communication interface 430. In embodiments, surface 410 may be a physical surface (e.g., constructed of plastic, metal, composite material, etc.) that when touched by a user results in information entered via surface 410. In embodiments, surface 410 may be a surface with printed features that assist a user to determine what information can be entered when touching a particular part of the surface. In alternate embodiments, surface 410 may be a glass or composite material that allows surface 410 to be used as a touchscreen. Accordingly, with surface 410 being a touchscreen, a user may touch an area of the screen with information which then results in that information being inputted via surface 410. Furthermore, one or more instructions or gestures that touch touchscreen in a particular pattern which may change the type of information that is associated with a particular area of surface 410.

In embodiments, microcontroller 420 may be similar to processor 320 and also have additional electronic features. In embodiments, microcontroller 420 may include tactile switch 420A, motion sensor 420B, and haptic controller 420C. In embodiments, the analysis, communication, storage, and/or other electronic features of tactile switch 420A, motion sensor 420B, and haptic controller 420C may be combined together and performed by microcontroller 420. In alternate embodiments, the analysis, communication, storage, and/or other electronic features of tactile switch 420A, motion sensor 420B, and haptic controller 420C may be conducted by another device in communication with microcontroller 420. In embodiments, tactile switch 420A, motion sensor 420B, and haptic controller 420C may be separate devices that are part of device 400 or may be partially or completely combined together as one or more devices.

In embodiments, tactile switch 420A may be a mechanism or other device that is associated with a motion sensor device.

In embodiments, motion sensor 420B may be a motion sensor such as a Micro-Electro-Mechanical Systems (MEMS) gyro or accelerometer detects motion of the device and communicates the motion to the microcontroller 420 via an I2C, SPI or serial connection. In embodiments, haptic controller 420C may be a haptic vibrator controller connected to a vibration motor can share the bus with the gyro or use a separate connection.

Figure 5:
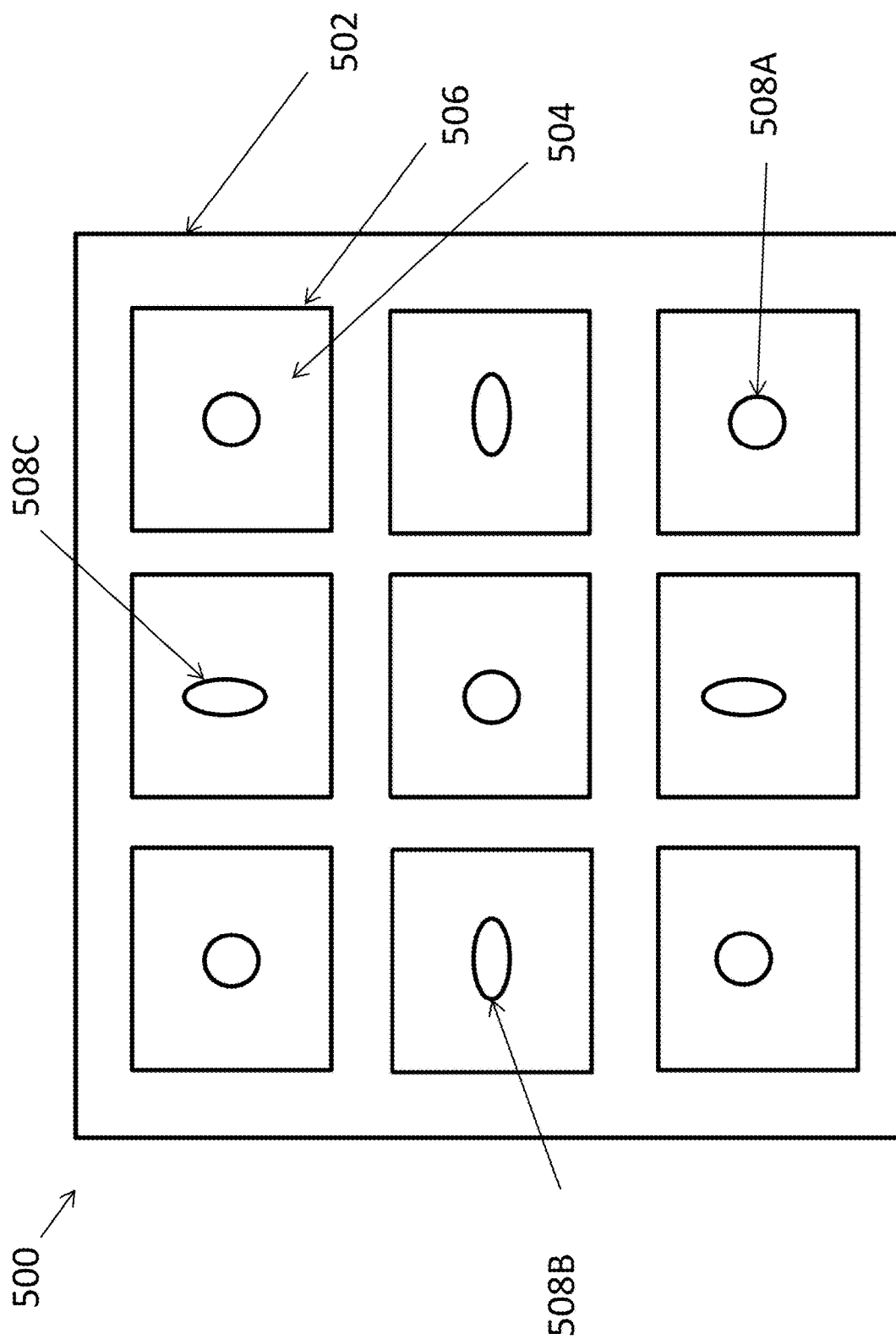
FIG. 5 is a diagram of an example surface area for an electronic input system.

FIG. 5 is an example diagram of a surface area 500 associated with an electronic input system such as input device 126. In embodiments, input device 126 may include one or more surface areas 500. While shown as rectangular and/or square features, surface area 500 may also have features of other shapes, regular and/or irregular. As shown in FIG. 5, surface area 500 may include a border 502. In embodiments, border 502 may be used to delineate one surface area 500 from another surface area 500 when input device 126 has multiple surface areas 500. In embodiments, border 502 may be an area that is raised higher than the remainder of surface 500 to allow a person, when touching border 502, to determine that border 502 exists. In embodiments, border 502 may have a texture or design that differentiates border 502 from surface 500.

In embodiments, surface area 500 may further include sub-areas 504. In embodiments, sub-area 504 may have its own border 506 that allows for each sub-area 504 to be differentiated from another sub-area 504. In embodiments, border 506 may differentiate one sub-area 504 from another sub-area 504. In embodiments, each border 506 may a pattern or design that differentiates it from other borders 506. As shown in FIG. 5, there are nine sub-areas 504; however, surface area 500 may have greater or fewer sub-areas 504. In embodiments, each sub-area 504 may have an area, bumps 508A, 508B, and 508C, that are at or around the center of each sub-area 504 and have a particular shape. In embodiments, bumps 508A, 508B, and 508C may a particular shape (e.g., circle, oval shaped, etc.) and may be orientated in a particular direction. For example, as shown in FIG. 5, bumps 508B and 508C are both shown as oval shaped. However, bump 508B is orientated in a different direction than bump 508C. In embodiments, bumps 508A and 508B may have their surface area raised above the rest of each sub-area 503.

Figure 6:
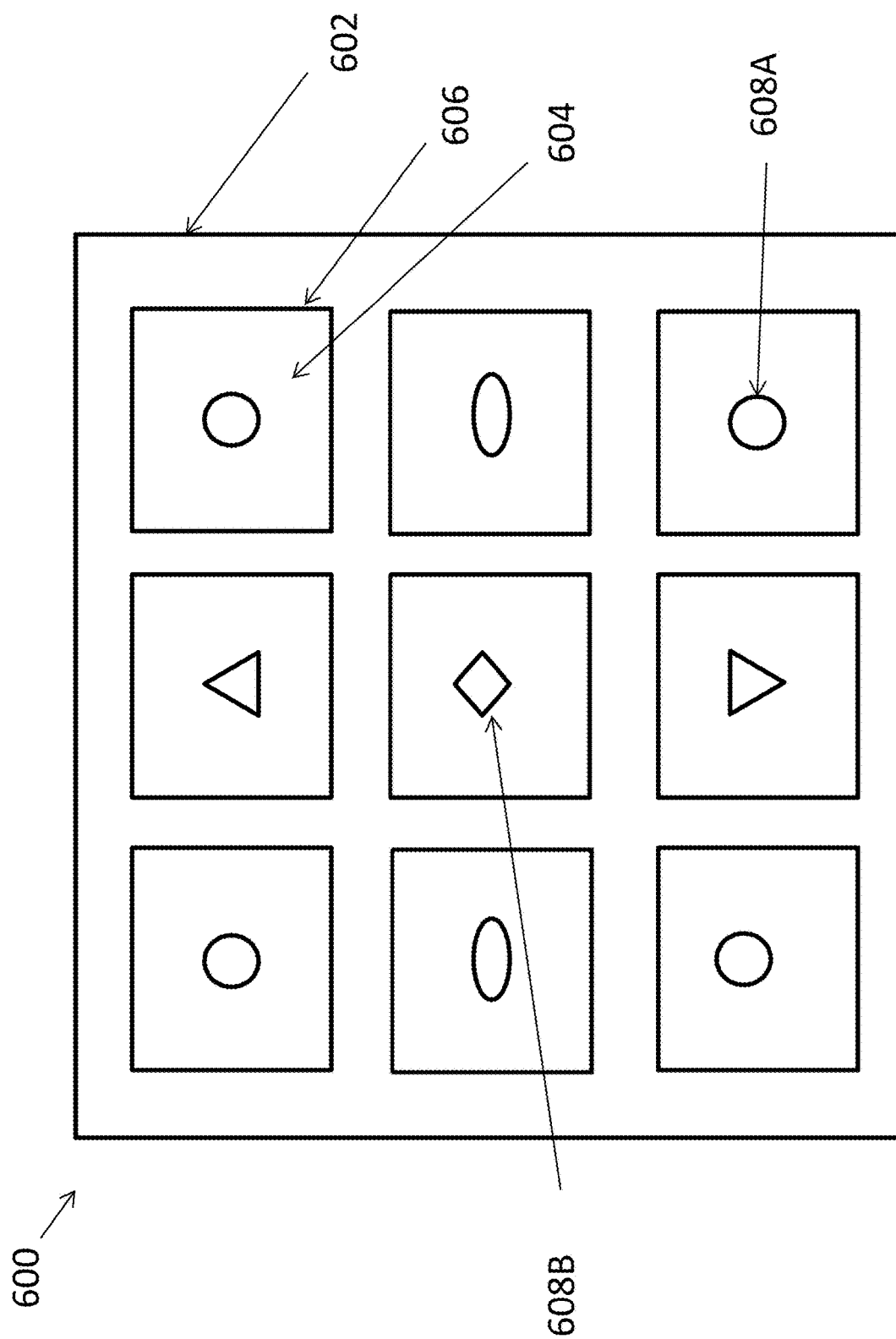
FIG. 6 is a diagram of an example surface area for an electronic input system.

FIG. 6 is an example diagram of a surface area 600 associated with an electronic input system such as input device 126. In embodiments, input device 126 may include one or more surface areas 600. As shown in FIG. 6, surface area 600 may include a border 602. In embodiments, border 602 may be used to delineate one surface area 600 from another surface area 600 when input device 126 has multiple surface areas 600. In embodiments, border 602 may be an area that is raised higher than the remainder of surface 600 to allow a person, when touching border 602, to determine that border 602 exists.

In embodiments, surface area 600 may further include sub-areas 604. In embodiments, sub-area 604 may have its own border 606 that allows for each sub-area 604 to be differentiated from another sub-area 604. As shown in FIG. 6, there are nine sub-areas 604; however, surface area 600 may have greater or fewer sub-areas 604. In embodiments, each sub-area 604 may have an area, bumps 608A, 608B, and 608C, that are at or around the center of each sub-area 604 and have a particular shape. In embodiments, bumps 608A and 608B may a particular shape (e.g., circle, oval shaped, etc.) and each shape assists in determining a particular sub-area 603 in comparison to other sub-areas 604. In embodiments, bumps 608A and 608B may have their surface area raised above the rest of each sub-area 603.

Figure 7A:
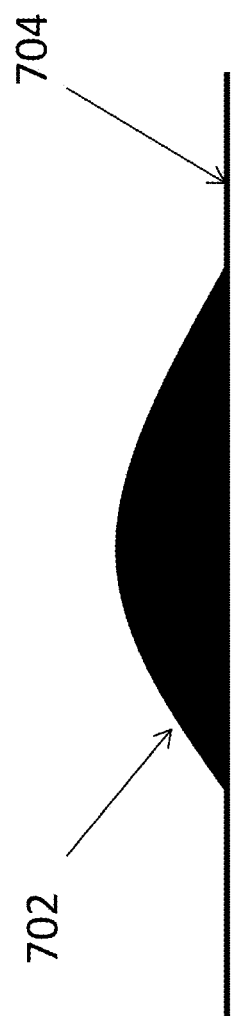
FIGS. 7A-7C are diagrams of example surfaces associated with an electronic input system.
Figure 7B:
Figure 7C:

FIGS. 7A to 7C are example bumps associated with an electronic input system. In embodiments, the example bumps may be similar to bumps 508A, 508B, and 508C as described in FIG. 5 and/or similar to bumps 608A and 608B as described in FIG. 6. As shown in each of FIGS. 7A to 7C, a bump may when raised from the surface of a sub-area. As shown in FIG. 7A, bump 702 may be raised above sub-area 704. As shown in FIG. 7B, bump 706 may be raised above sub-area 708. As shown in FIG. 7C, bump 710 may be raised above sub-area 712. In embodiments, bumps 702, 704, and 706 are example bumps and sub-areas may have different designed bumps.

Figure 8:
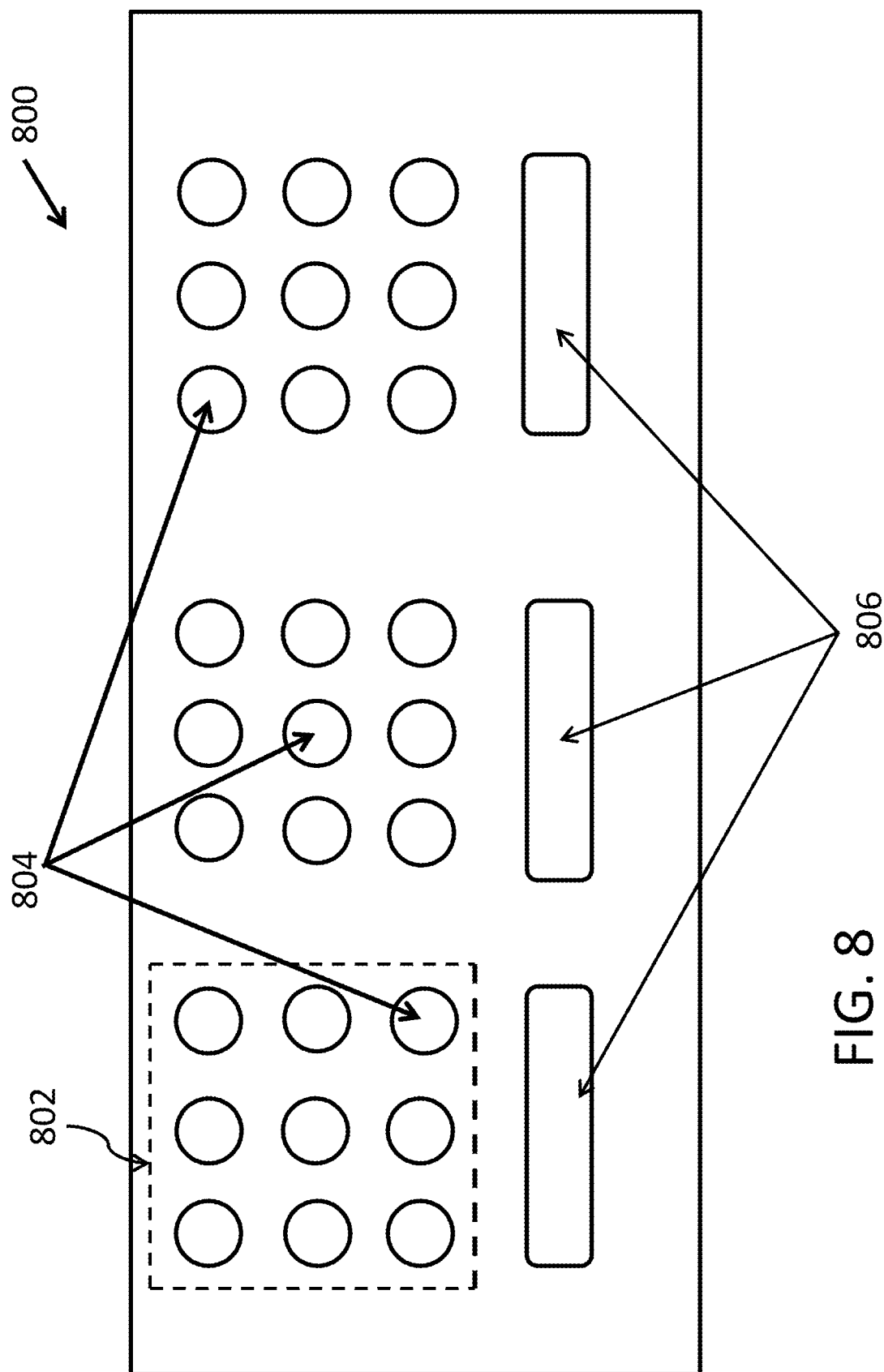
FIG. 8 is a diagram of an example electronic input system.

FIG. 8 shows an example electronic input system 800 with capacitive touchpads. In embodiments, electronic input system 800 may be similar to input device 126. In embodiments, electronic input system 800 has multiple sub-areas, such as area 802. In embodiments, area 802 may have multiple sub-areas 804, similar to sub-area 502 or 602 as described in the above figures. In embodiments, electronic input system 800 may also include touch areas 806. In embodiments, each touch area 806 may be used to select a particular area 802 which is then used for entering information.

Figure 9:
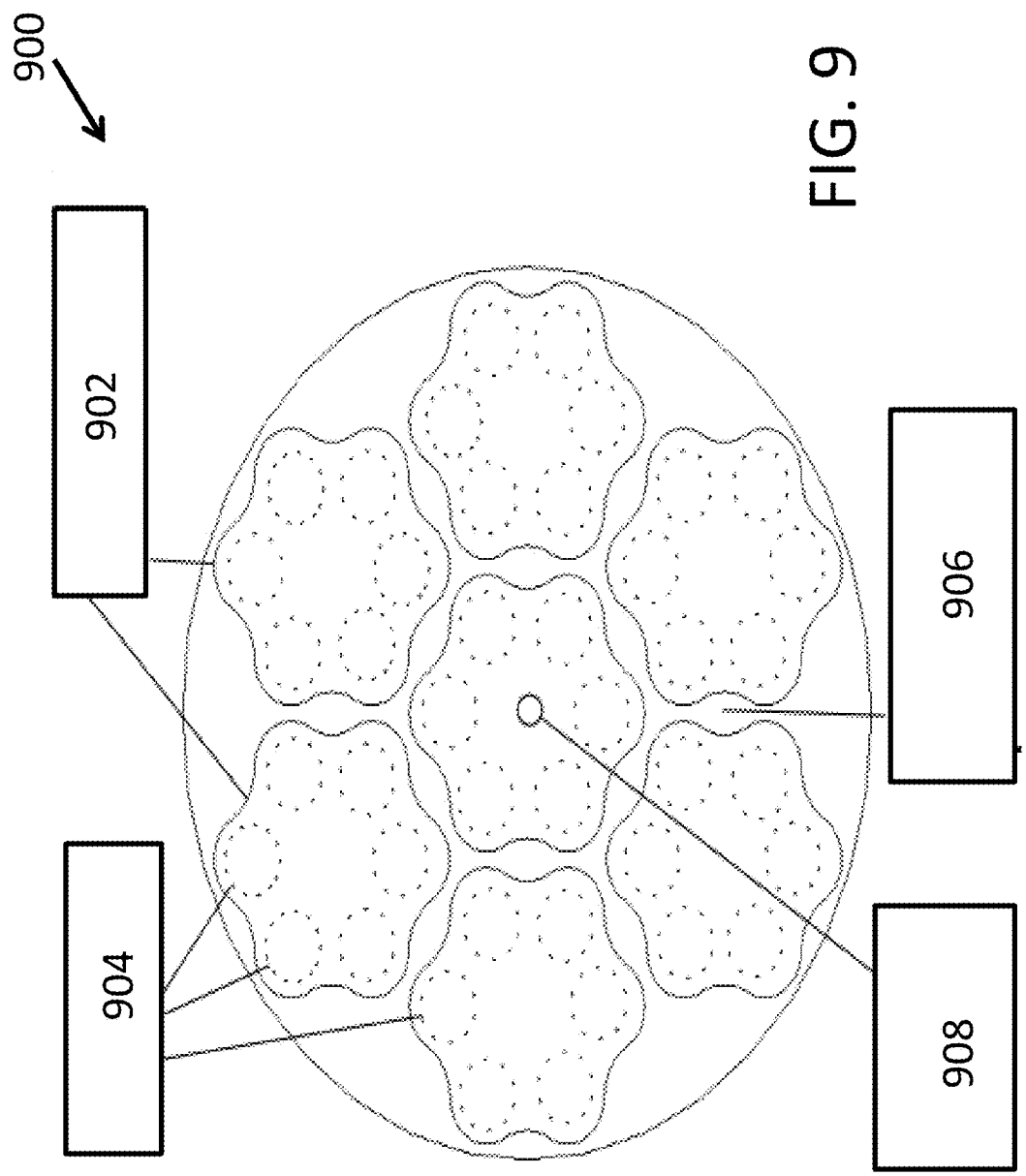
FIG. 9 is a diagram of an example electronic input system.

FIG. 9 shows an example electronic input system 900. In embodiments, electronic input system 900 may be similar to input device 126. As shown in FIG. 9, electronic input system 900 may include areas 902. In embodiments, each area 902 may include sub-areas 904. In embodiments, sub-areas 904 may be similar to sub-area 502 or 602 as described in the above figures. Furthermore, FIG. 9 shows area 906 which upon areas 902 are placed upon with areas 902 having raised surfaces in a manner similar to those bumps described in FIG. 7. FIG. 9 also shows home bump 908 which may be used to select a different menus that can be displayed on a screen associated with a device, such as user device 124.

Figure 10:
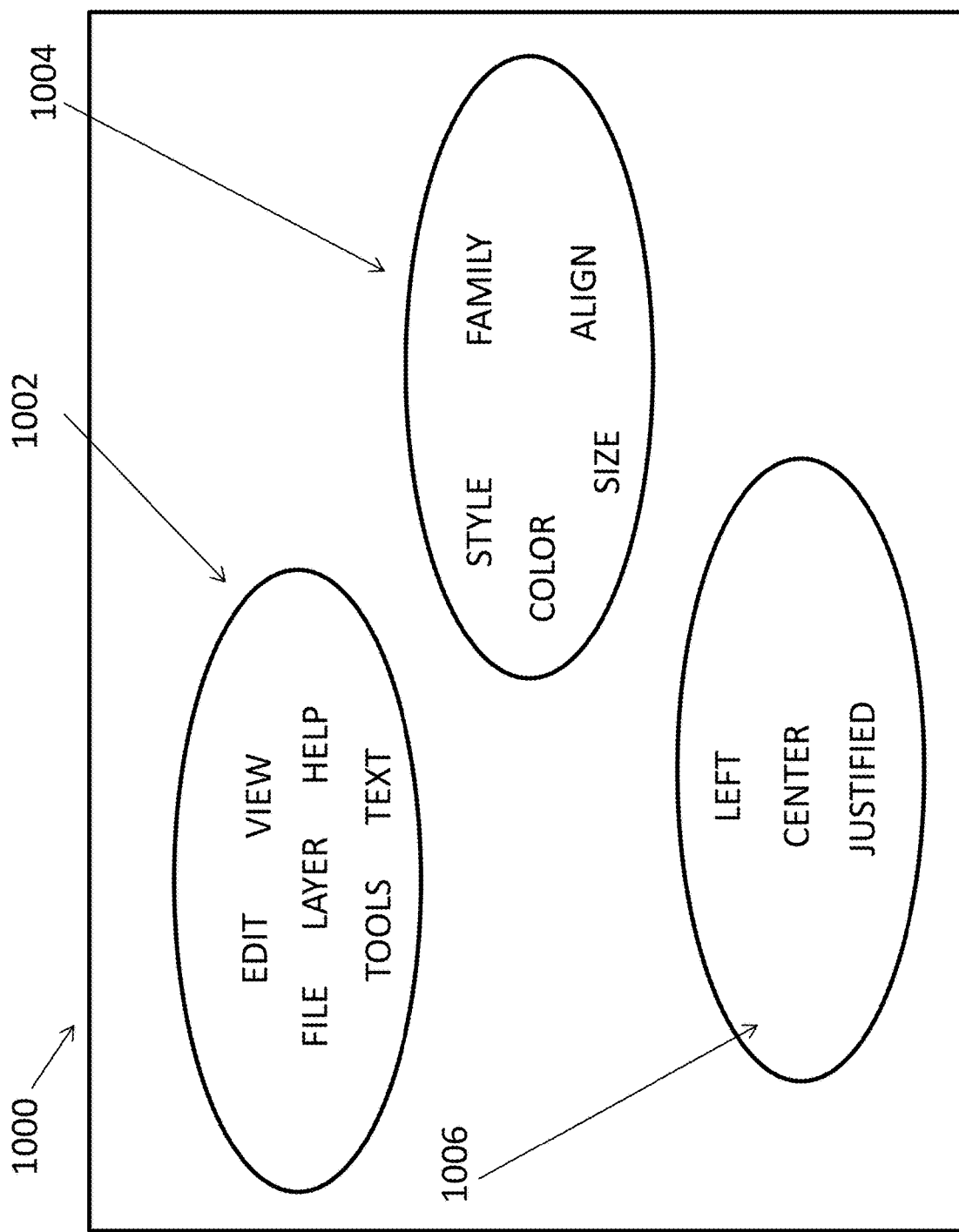
FIG. 10 is an example graphical user interface display.

FIG. 10 shows an example graphical user interface 1000 with multiple menu selections. In embodiments, one or more of the multiple menu selections appear on graphical user interface 1000 based on a user's interactions with an input device. i.e., input device 126. In embodiments, the menu selections 1002, 1004, and 1006 may appear to together or individually on graphical user interface 1000 based on a user's interaction with an input device, i.e., input device 126. As shown in FIG. 10, menu selection 1002 may be generated by input device 126 and/or analysis server 130. In embodiments, menu selection 1002 may be generated when a particular sub-area of input device 126 is selected, such as sub-area 502, sub-area 602, or home bump 908 as described in the above figures. In embodiments, menu selection 1002 and/or menu selections 1004 and 1006 may be selected by touching a sub-area (as described in the above figures) in a particular manner (e.g., pressing or touching the sub-area by swiping the sub-area in a particular direction, pressing or touching a sub-area for a particular amount of time, etc.). In embodiments, menu selections 1002, 1004, and 1006 may be electronically generated and displayed on a graphical user interface based on the type of electronic communication received from an input device, such as input device 126. In embodiments, the electronic information displayed in menu selections 1002, 1004, and/or 1006 may change based on analysis by analysis server 128. In embodiments, analysis server 128 may analyze patterns of previous electronic inputs to determine which types of displayed information may result in less time being used to input electronic input. In embodiments, menu selection 1002 may include commands for editing. In embodiments, menu selection 1004 may include commands for style and color. In embodiments, menu selection 1006 many include commands for position of display of electronic information.

Figure 11:
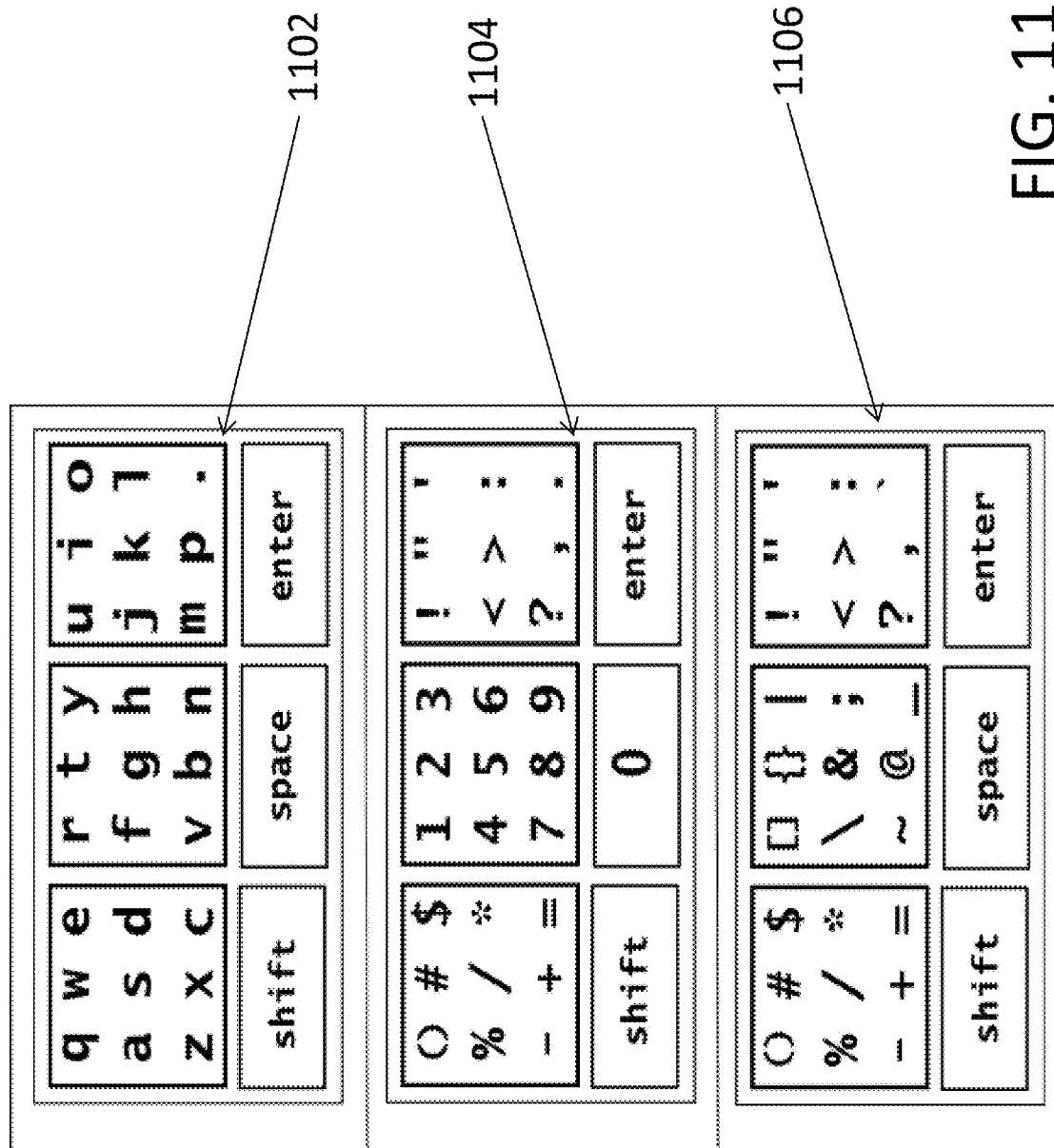
FIG. 11 is an example diagram of an electronic input system.

FIG. 11 shows example sub-areas that are displayed on a touchscreen surface of an input device such as input device 126. As shown in FIG. 11, touchscreen area 1102 may be displayed as a default display when the input device is initially turned. In embodiments, touchscreen area 1102 may include then be used by a user of the input device to enter electronic information. In embodiments, the user may decide that they want to enter other types of electronic information and decides to change the displayed information of the input device's touchscreen. Accordingly, in embodiments, a particular action by a user may be translated into a particular electronic command that changes the touchscreen display from touchscreen area 1102 to another touchscreen area such as touchscreen area 1104, 1106, or any other touchscreen area. As shown in FIG. 11, each touchscreen area displays different information. In embodiments, touchscreen area 1102 may also change an area within touchscreen area 1102 to display other information in a particular area based on electronic analysis by analysis server 128. In embodiments, analysis server 128 may determine based on patterns of previous inputs that particular areas of touchscreen 1102 should be changed to display other information. For example, as shown in FIG. 11, touchscreen area has a sub-area with "q w e." Based on analysis of patterns of previous electronic inputs, analysis server 128 may determine that time between electronic inputs can be reduced if the sub-area had "q e w." Accordingly, in this non-limiting example, one sub-area of a touchscreen area may be changed while other sub-areas stay the same.

Figure 12:
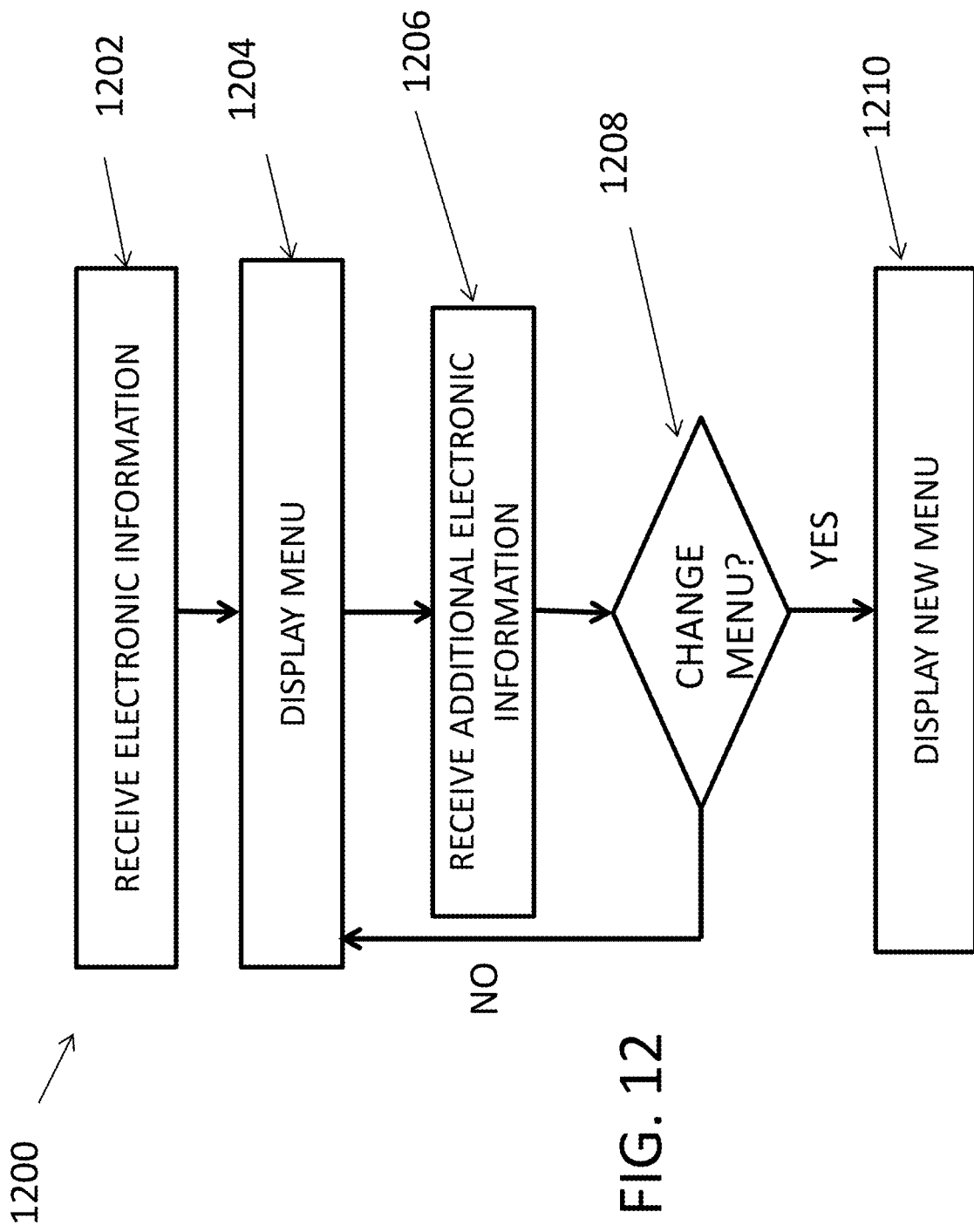
FIG. 12 is an example flow diagram for displaying information associated with an electronic input system.

FIG. 12 describes a flow chart of an example process 1200 for displaying information associated with an electronic input system. In embodiments, example process 1200 may be performed by user device 124 and/or input device 126. At step 1202, user device 124 and/or input device 126 may receive electronic information. In embodiments, user device 124 and/or input device 126 may receive the electronic information that is generated when a particular area or sub-area of input device 126 is selected. At step 1204, user device 124 and/or input device 126 may display an electronic menu, such as menu selection 1002. At step 1206, user device 124 and/or input device 126 may receive additional electronic information. In embodiments, user device and/or input device 126 may analyze the additional electronic information. At step 1208, user device 124 and/or input device 126 may determine whether to change the displayed menu. If user device 124 and/or input device 126 determine to change the displayed menu (1208—YES), then at step 1210, the new menu is displayed. If user device 124 and/or input device 126 determine not to change the displayed menu (1208—NO), then the same menu is displayed (as described in 1204).

Figure 13A:
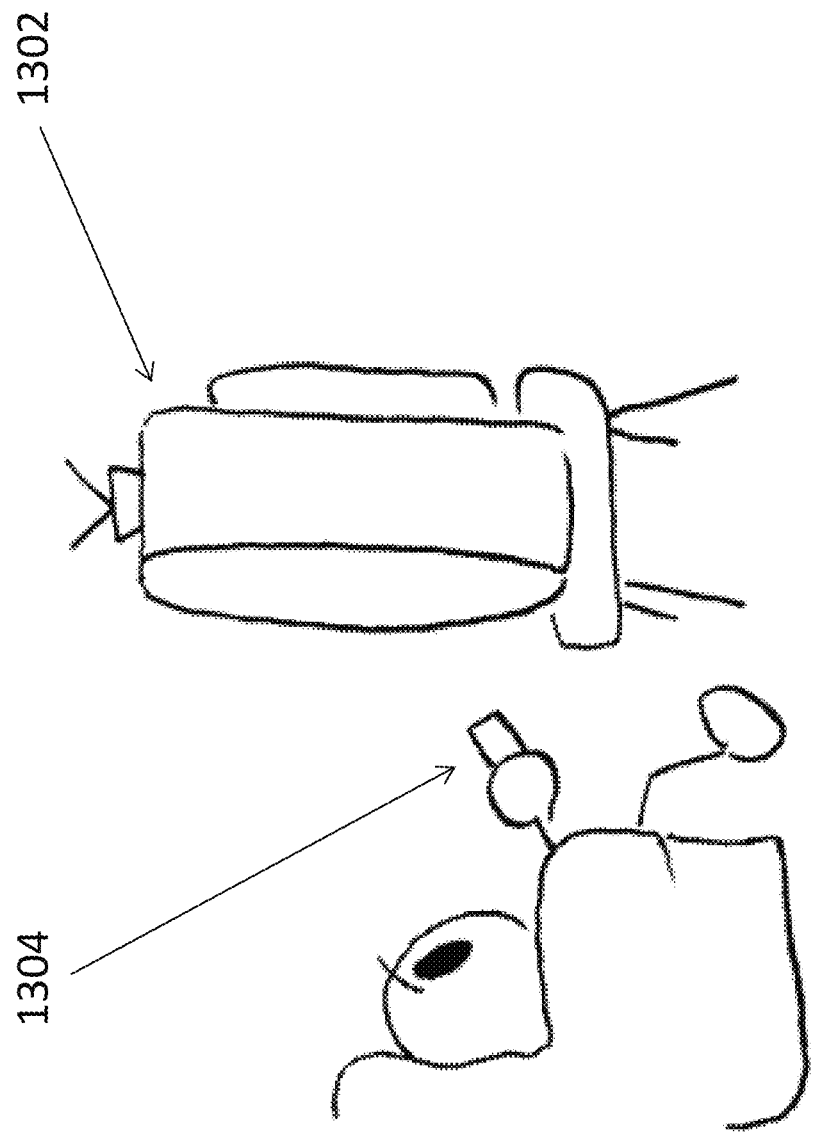
FIGS. 13A and 13B are of an example environment in which systems and/or methods described herein may be implemented.
Figure 13B:
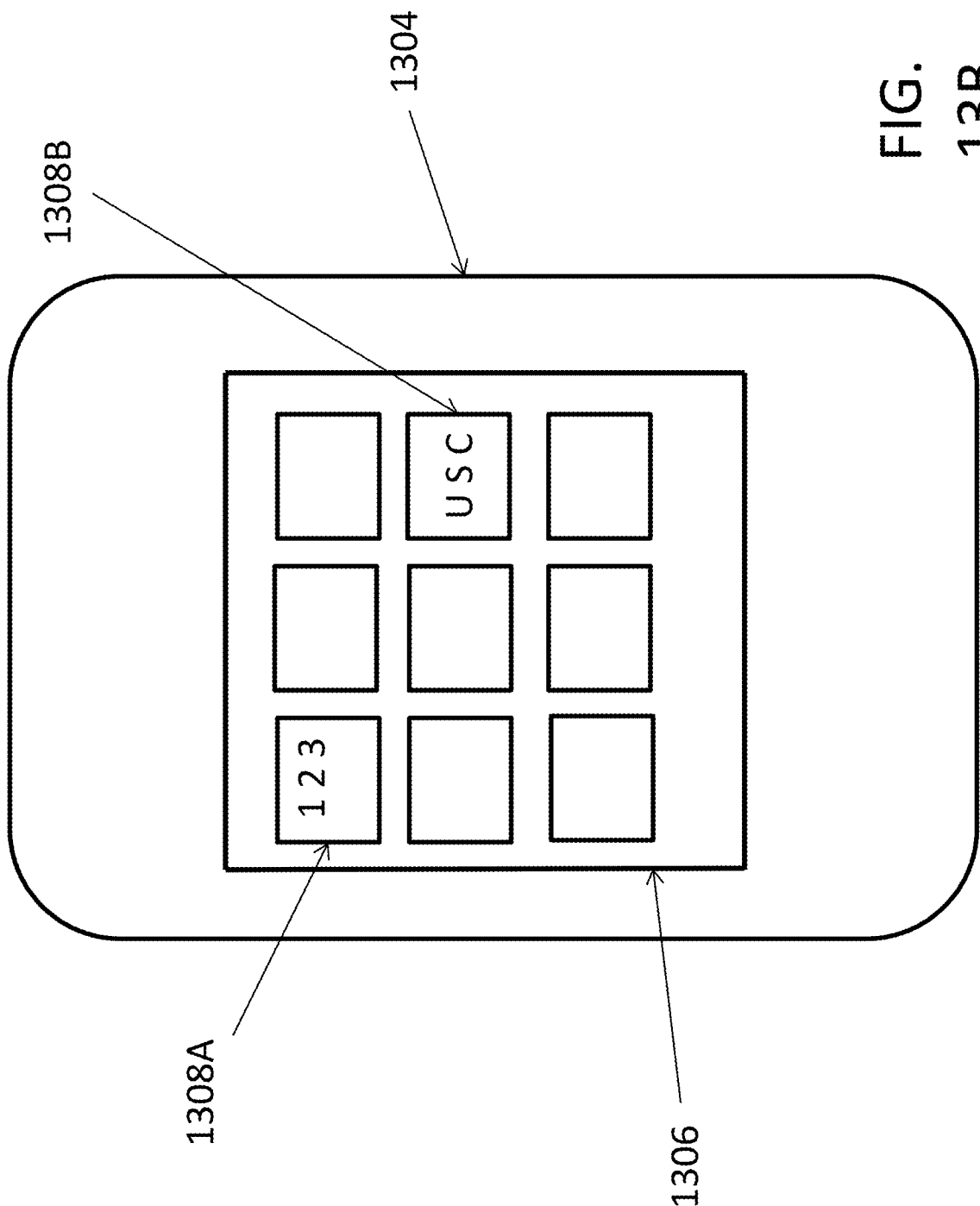

FIGS. 13A and 13B are diagrams of an example process for an example environment in which systems and/or methods described herein may be implemented. As shown in FIG. 13A, a person is watching a program on television 1302 and holding a television remote 1304 to control what the person can watch on television 1302. FIG. 13B, describes input device 1304 in further detail. As shown in FIG. 13B, input device 1302 has area 1306 which is further delineated into different regions with each region allowing for input of particular information. As shown in FIG. 1B, one of those regions is 1308A and another region is 1308B. In embodiments, region 1308A may allow the person to input "1," "2," or "3" at any given time and region 1308B may allow the person to input "U," "S," or "C" at any given time.

Figure 14A:
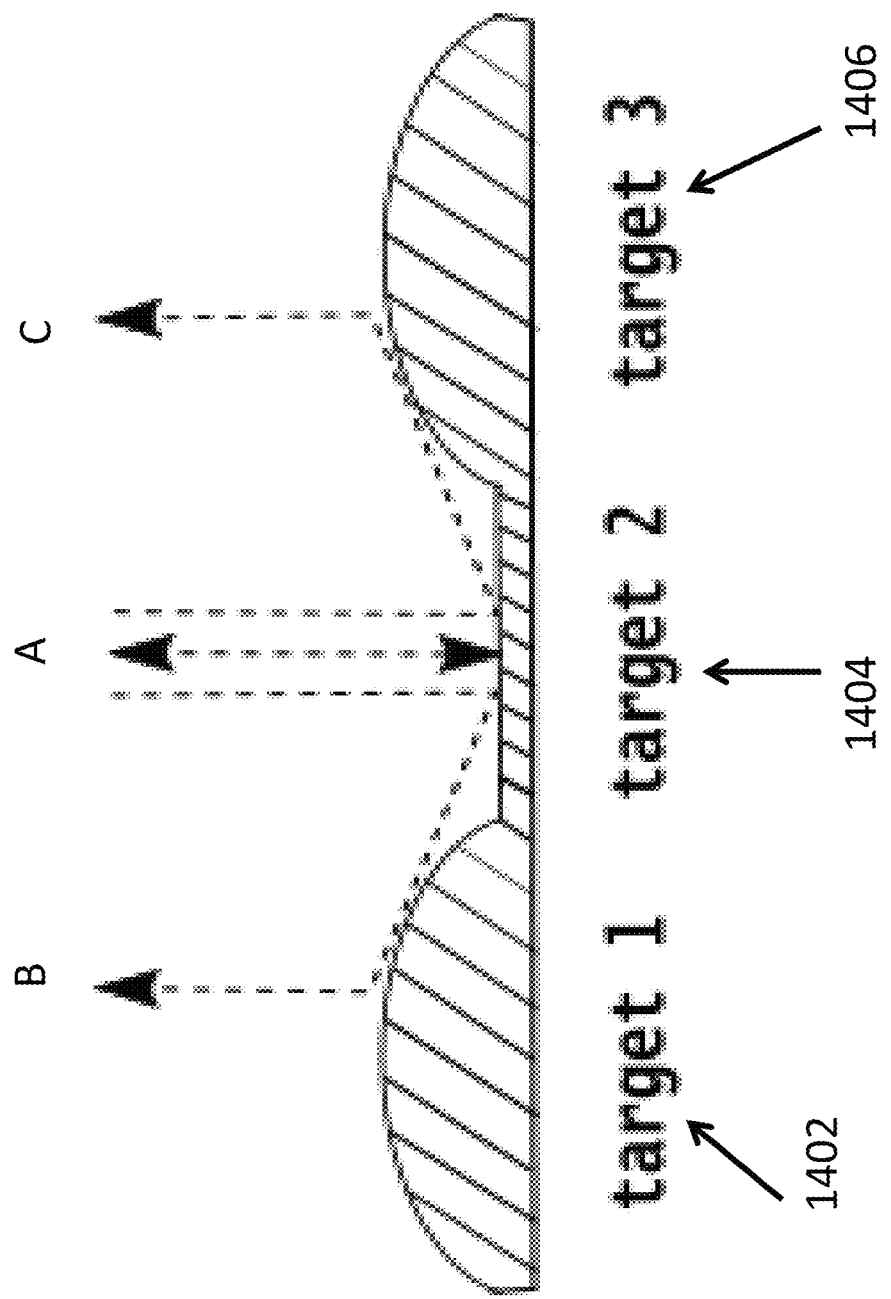
FIGS. 14A and 14B are example diagrams of example surfaces associated with an electronic input system.

FIG. 14A shows additional example bumps associated with electronic inputs. FIG. 14A shows targets (e.g. bumps) 1402, 1404, and 1406. In embodiments, one or more targets described in FIG. 14A (and in FIG. 14B) may translate touch gestures into computer input values. In embodiments, each target includes position feedback features (changes to the surface level or textures) that are detectable by a human body part (e.g., a finger, thumb, etc.) that is moving over the surface of an input system. In embodiments, a touch gesture may be the touching of a touch target or a movement of a finger (for example) moving across the surface from a press target to a release target. Accordingly, a target may be a press target, a release target, or a shift target, depending on the physical touch (i.e., gesture). In embodiments, a gesture may be initiated by a touch of a press target and completed by a touch of a release target. In embodiments, the location of a press target may be determined by propricoception and the feedback features may guide the finger towards a press target and then guide the finger to a release target. In embodiments, a touch gesture may be extended by adding a shift target to a beginning of a gesture which can change an input value associated with the gesture (e.g., from "a" to "A"). Thus, with a shift target, a finger may begin a gesture by touching a shift target, then a press target, and then a release target.

Figure 14B:
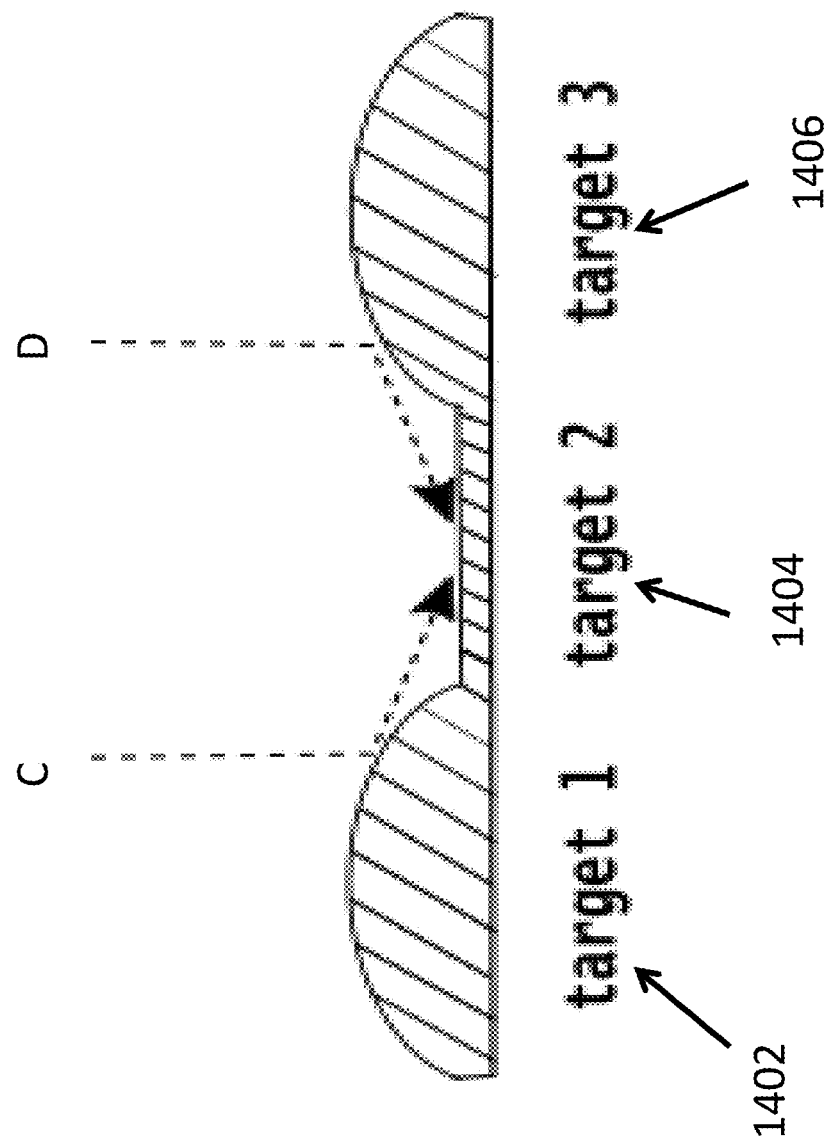

As shown in FIG. 14A, targets 1402 and 1406 are raised above target 1404 to form two position feedback features (the raised surface). In embodiments, the size and spacing of the features are such that a finger centered on target 1404 may be contact with all three described targets. In embodiments, all touches (touch A) may begin with a touch of target 1404 but may be completed by touching a different target (touch B or touch C) before lifting the finger off the surface. In embodiments, each gesture may produce a different input value. In FIG. 14B, a finger may not touch target 1404 but may touch target 1402 or 1406 first. Accordingly, the raised features of target 1402 or 1406 may guide the finger towards to target 1404 (a press target). In embodiments, a feel of the features evenly on each side of a finger verifies a correct position of the finger on a target. Once an initial target is touched, a finger may be lifted to complete a simple target touch gesture or moved to targets 1402 or 1406 to complete a two-target gesture.

Figure 15:
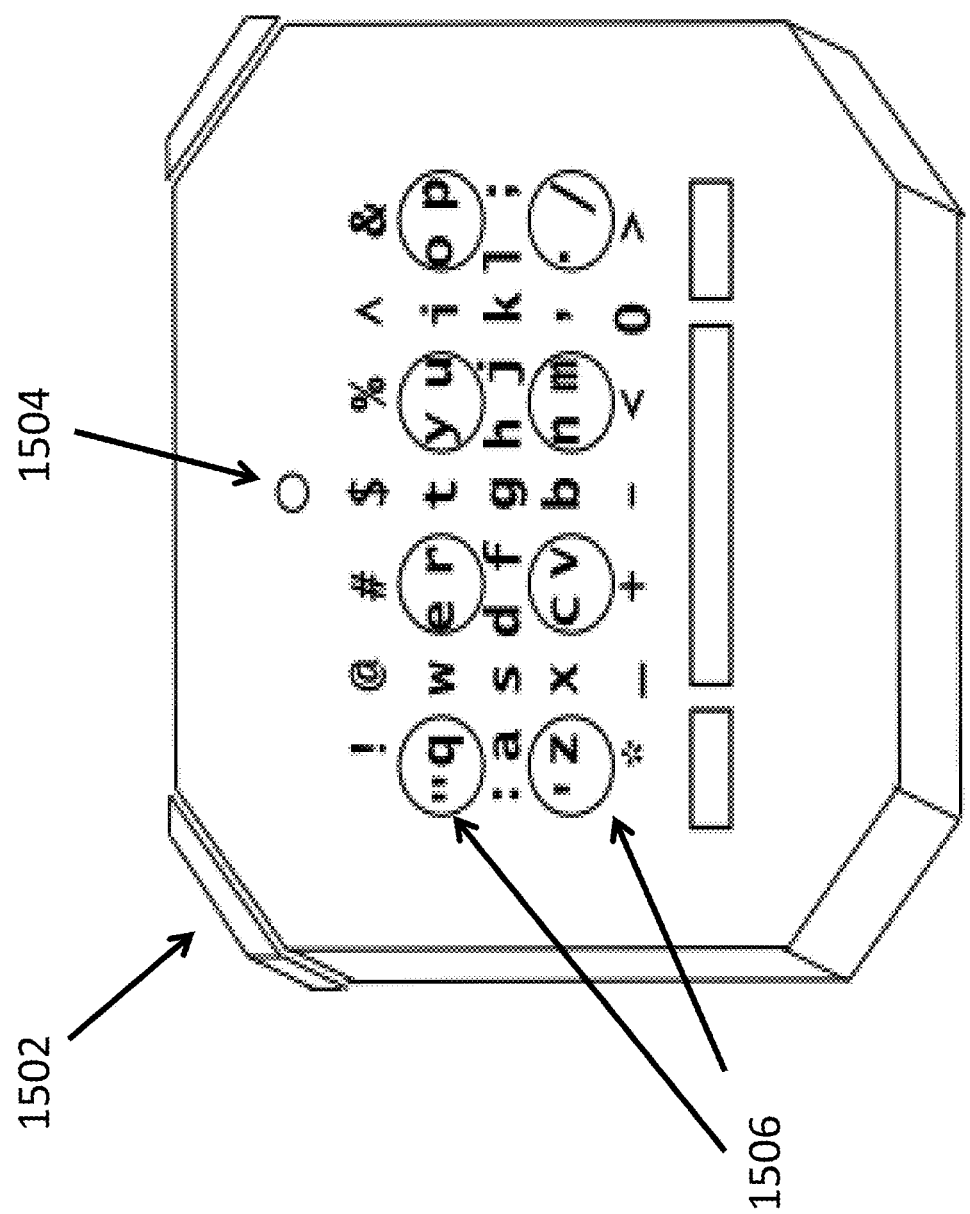
FIG. 15 is an example diagram of an example input system.

FIG. 15 shows an example character entry area in the form of a key FOB. As shown in FIG. 15, there are 21 one-touch targets (e.g., "w," "s," "k," etc.). Also, as shown in FIG. 15, there are eight raised "bumps" (e.g., targets). In embodiments, the bumps are located between other bumps so that a finger (or thumb) may in contact with one to four one-touch targets. In embodiments, capacitive contacts located under each bump may act as touch sensors that are capable of detecting finger proximity. Accordingly, these features provide tactile feedback that may allow a user to know based on touch which target is being touched.

Also, as shown in FIG. 15, there are three touch sensors in the form of a raised bar which may serve as a space bar. In embodiments, additional sensors on the left and right of the space bar serve as a caps shift key and enter key respectively. In embodiments, the caps shift key may cause the following alphabetic character entered to be in upper case. In embodiments, an RGB LED positioned above the character area, may provide visual feedback indicating the keyboard mode or state such as caps lock or command mode. In command mode, each micro gesture causes a command to be issued rather than a character. Accordingly, when in command mode a graphic can be shown on the display device that marks the release locations with icon representations of the command issued for the gesture that ends at that location.

In embodiments, the twenty-one targets are arranged in a grid of three rows and seven columns. In embodiments, bumps with embedded contact sensors are positioned over every other target in the first and third rows. The triggering of a single sensor indicates that the target at that sensor is being touched. Two triggered sensors indicate that the target between the two sensors is being touched. In embodiments, four triggered sensors indicate that a finger is in contact with the area between four of the sensors. Thus, character values are selected through the execution of touch gestures guided by the position feedback features.

Figure 16:
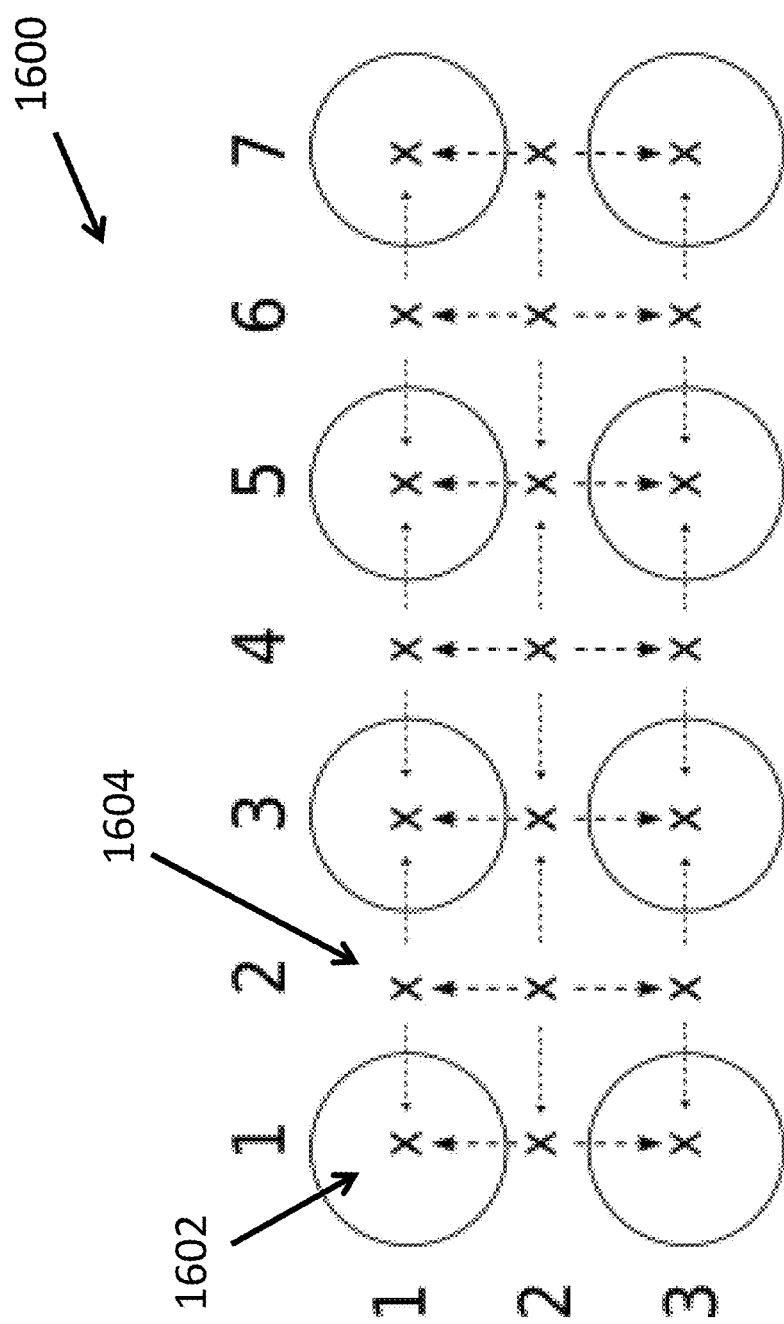
FIGS. 16, 17, and 18 are example entry areas.

FIG. 16 shows an example entry area 1600. As shown in FIG. 16, example entry area 1600 includes eight touch sensitive feedback surfaces features, such as feature 1602 which are also identified by row and column values (e.g., as shown with rows 1 to 3 and columns 1 to 7). In embodiments, feature 1602 may be similar to 1402 as described in FIG. 14A or 14B. In embodiments, feature 1604 may be similar to 1404 as described in FIG. 14A or 14B. As shown in FIG. 16, the touch sensitive feedback surface features assist movements in directions from in both a horizontal and vertical movements. In embodiments, the circles may represent touch sensitive position feedback surface features. In embodiments, the dashed lines in FIG. 16 represent valid target gestures.

Figure 17:
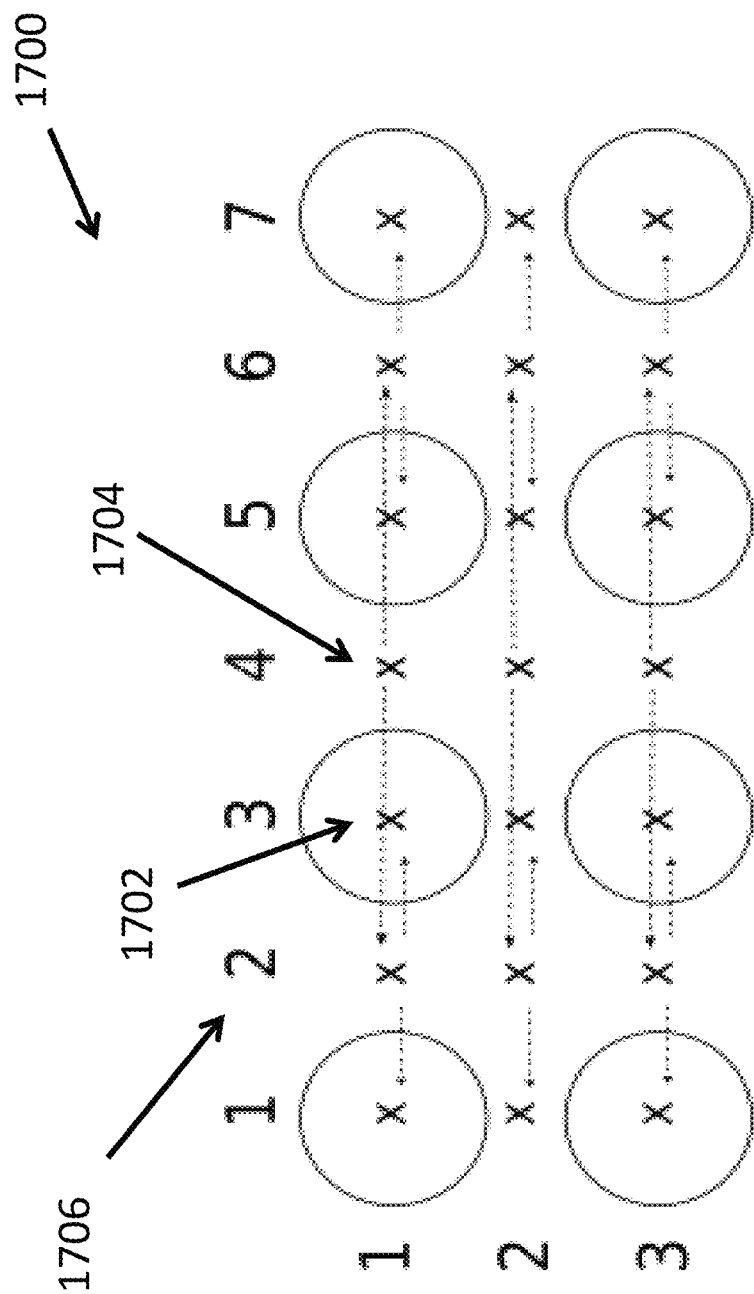

FIG. 17 shows an example entry area 1700. As shown in FIG. 17, example entry area 1700 includes eight touch sensitive feedback surfaces features, such as feature 1702, which are also identified by row and column values (e.g., as shown with rows 1 to 3 and columns 1 to 7). In embodiments, feature 1702 may be similar to 1402 as described in FIG. 14A or 14B. In embodiments, feature 1704 and 1706 may be both types of 1404 as described in FIG. 14A or 14B. As shown in FIG. 17, the touch sensitive feedback surface features assist in finger movements in horizontal directions that assist in movement to another feature. For example, feature 1704 acts as a shift feature and assists in directing to either features 1702 or 1706.

Figure 18:
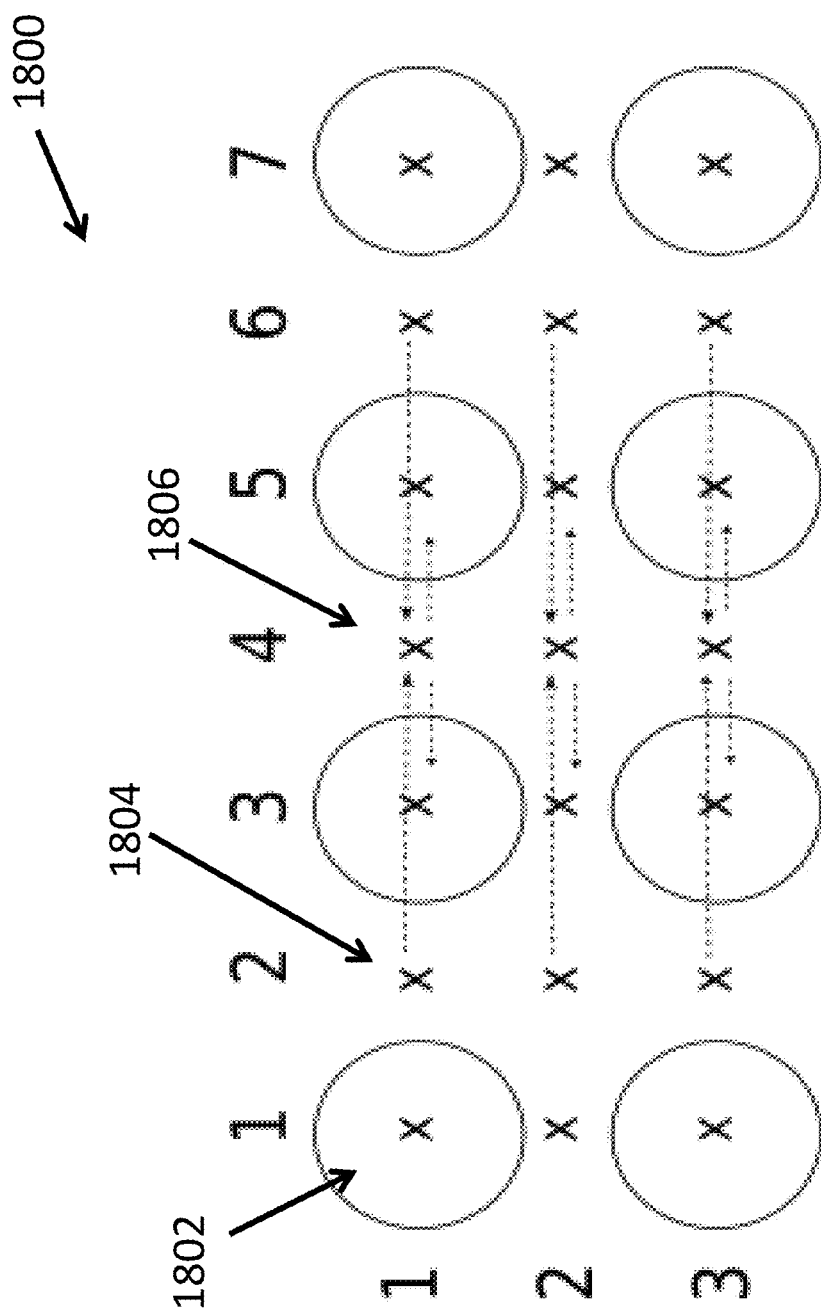

FIG. 18 shows an example entry area 1800. As shown in FIG. 18, example entry area 1800 includes eight touch sensitive feedback surfaces features, such as feature 1802, which are also identified by row and column values (e.g., as shown with rows 1 to 3 and columns 1 to 7). In embodiments, feature 1802 may be similar to 1402 as described in FIG. 14A or 14B. In embodiments, feature 1804 and 1806 may be both types of 1404 as described in FIG. 14A or 14B. As shown in FIG. 18, the touch sensitive feedback surface features assist in finger movements in horizontal directions that assist in movement to another feature. For example, feature 1804 (e.g., position 2,1 or 1,2 based on column and row numbering) acts as a shift feature for gestures that may be in 1806 (e.g., 4,1 or 1,4).

In embodiments, for example entry area 1600, 1700, or 1800, momentary push button switches located adjacent to an entry area. In embodiments, a momentary push button may be used to determine whether an example entry area is used for a left-handed or right-handed person. Additionally, or alternatively, the momentary push button can also be used to alter values associated with different entry areas.

FIG. 19 shows example database 1900. In example database 1900, various movements and/or combinations of different positions are associated with different values, such as values associated with a QWERTY keyboard but used on an alternative keyboard as described in one or more examples. As shown in FIG. 19, target 1902 indicates movement from one target to another target such as field 1906 (2,1-1,1) or just touching one target such as field 1908 ("1,7") results in a value ("p" as shown in field 1909). In embodiments, field 1904 indicates an example column that has different values associated with different movements shown, such as, in column 1902. In embodiments, database 1900 may be associated with entry area 1600, 1700, or 1800. In embodiments values shown in field 1906 and other targets may be row by column or column by row based on entry areas described in FIGS. 16, 17, and/or 18. For example, using the features of example entry area 1800 shown in FIG. 18, moving from feature 1804 to 1802 may result in the electronic input of "!" Thus, field 1906 shows "2,1-1,1" where "2,1" indicates feature 1804 and "1,1" indicates 1802. A movement (e.g., finger or thumb movement) from "2,1" to "1,1" results in the electronic input of "!" as shown in field 1910. In embodiments, database 1900 also shows values that occur that are related to shifted or un-shifted actions. For example, a shifted action may be using a shift button to convert "t" to "T." In embodiments, as shown in database 1900, field 1912 is an un-shifted value "a" associated with moving from position 2,2 to position 2,1 while a shifted value would be a value "<" as shown in field 1914.

Figure 20:
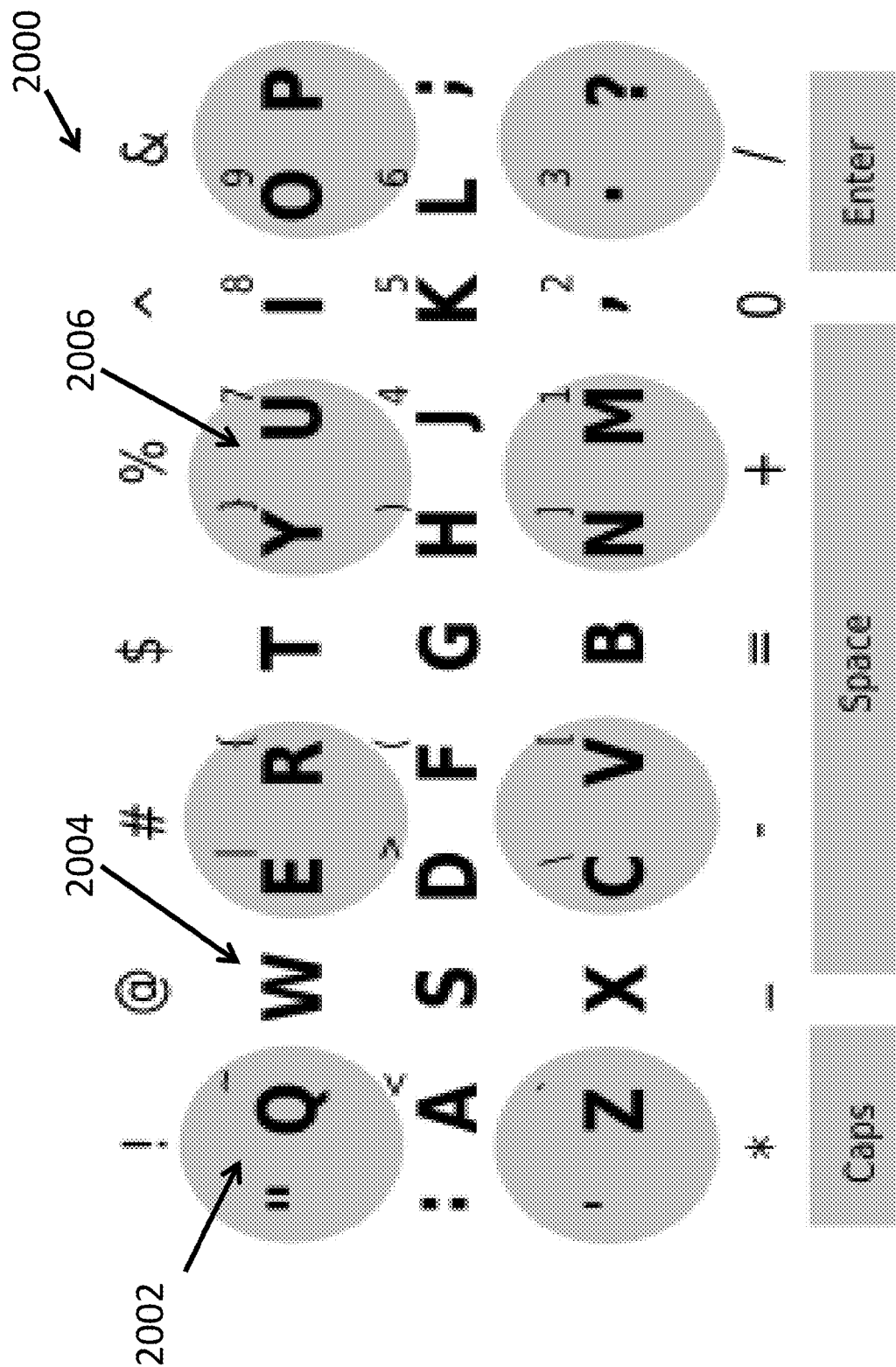
FIG. 20 is an example entry area.

FIG. 20 shows example entry area 2000. In embodiments, entry area 2000 may have printed symbols displayed on the entry area (e.g., keyboard). In embodiments, the symbols associated with the column gestures are printed above and below each corresponding column. In embodiments, the character symbols for the remaining gestures are printed at the location of the a particular release target. In embodiments, symbols associated with "shifted" gestures are printed as superscripts over the symbols for the "un-shifted" gestures. In embodiments, the printed labels are for learning the gestures and are not needed once the gestures are learned.

Figure 21:
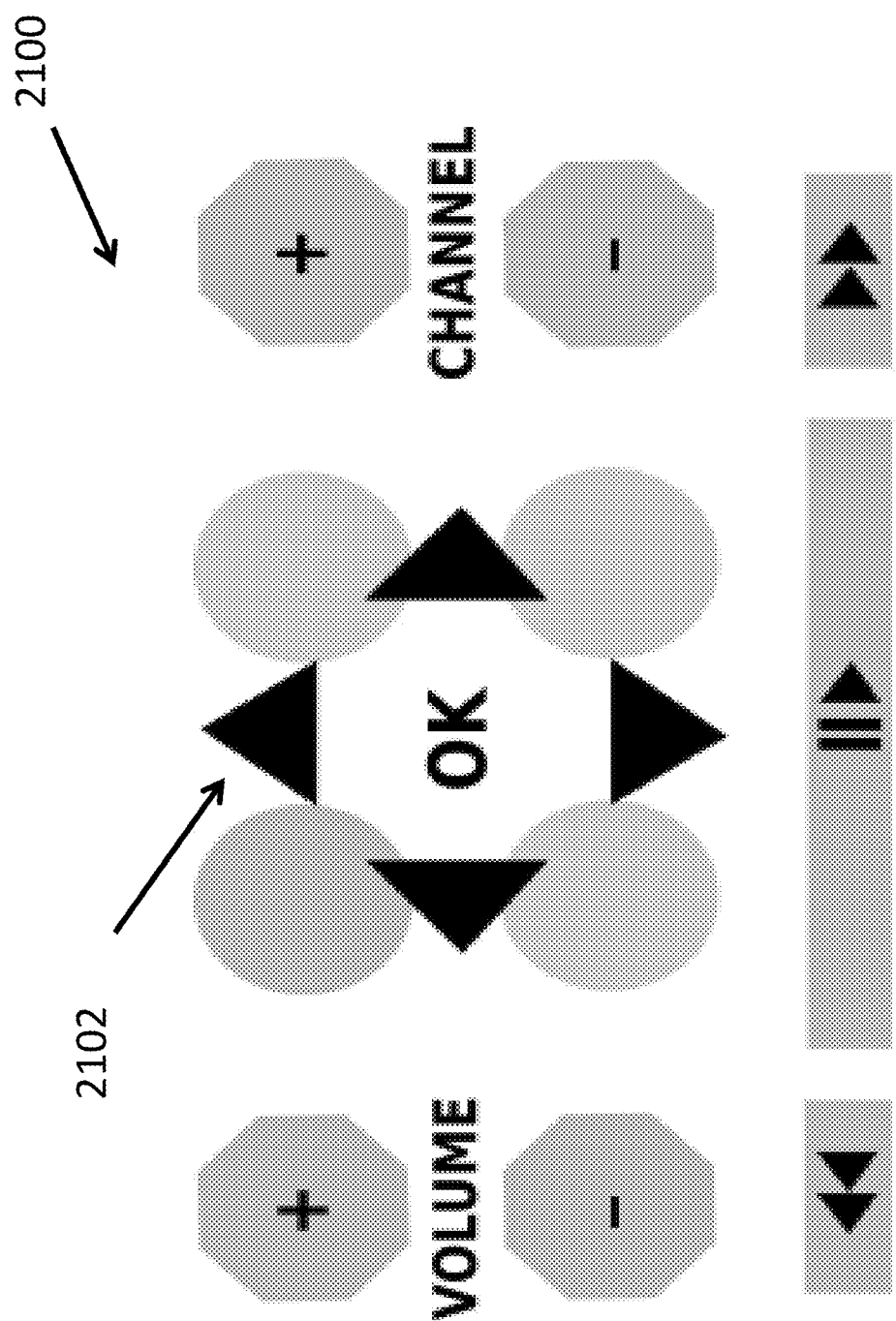
FIG. 21 is an example entry area.

FIG. 21 shows example entry area 2100. In embodiments, entry area 2100 may include different shift and target areas in a different entry area makeup. In embodiments, feature 2102 may be an up arrow symbol (e.g., used for channel or volume changes) that is selected based on the location of raised target areas.

Figure 22:
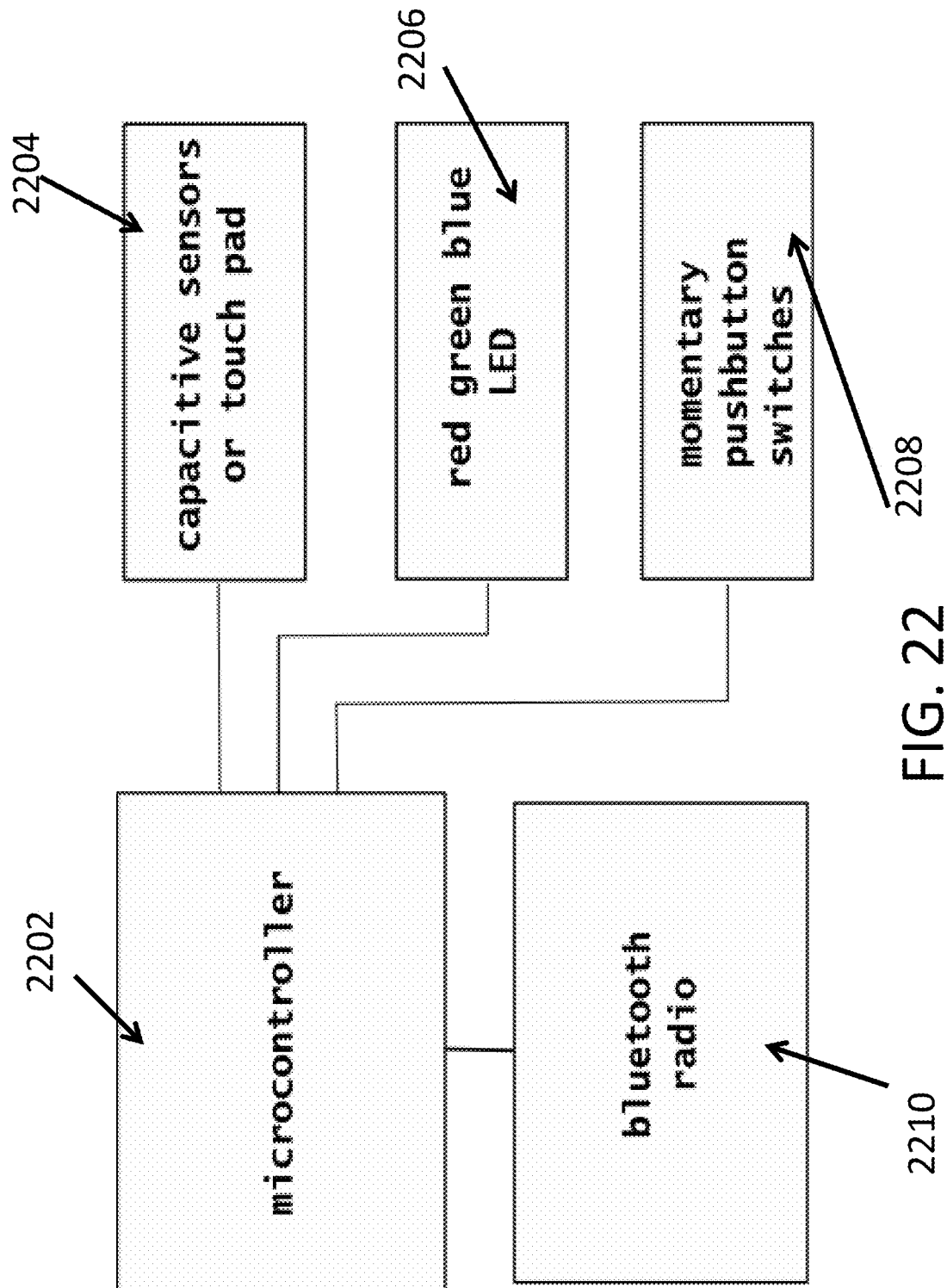
FIG. 22 are example components of a device.

FIG. 22 shows a diagram of example components of a device 400. In embodiments, FIG. 22 shows microcontroller 2202, capacitive sensors 2204, LED 2206, switches 2208, and Bluetooth radio 2210. In embodiments, microcontroller 2202 may be similar to processor 320 as described in FIG. 3, capacitive sensors 2204 may be similar to motion sensor 420B, LED 2206 may be different types of LED lights utilized in the keypad area, switches 2208 may be similar to tactile switch 420A, and Bluetooth radio 2210 may have similar features to communication interface 360 as described in FIG. 3.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing and/or electronic networking environment and may require one or more computing devices, as described in FIG. 2, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 2. Also it will be understood that any of the various actions can result in any type of electronic information to be displayed in real-time and/or simultaneously on multiple user devices (e.g., similar to user device 124). For FIG. 12, the order of the blocks may be modified in other implementations. Further, non-dependent blocks may be performed in parallel.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
receiving, by a device, electronic information;
receiving, by the device, additional electronic information,
where the device receives the additional electronic information via a keyboard,
where the keyboard has multiple sub-areas,
where each of the multiple sub-areas have bumps,
where the bumps are of different shapes,
where a time period between receiving the electronic information and the additional electronic information is less than another time period between receiving the electronic information and the additional electronic information by using a standard keyboard without the bumps;
displaying, by the device a menu on the touchscreen,
where the menu is displayed based on touching one or more of the multiple sub-areas in a particular order that is different than touching another order of touching the one or more of the multiple sub-areas used to display another menu on the touchscreen.

2. The electronic communications method of claim 1, where each of the multiple sub-areas has a border area that differentiates one of the multiple sub-areas from another of the multiple sub-areas.

3. The electronic communications method of claim 1, where each of the multiple sub-areas have a bump, where the bump is at a raised height than the rest of the area of each of the multiple areas.

4. The electronic communications method of claim 1, where each of the multiple sub-areas is associated with a capacitive touch pad.

5. The electronic communications method of claim 1, where the menu and the other menu are displayed together on a graphical user interface.

6. The electronic communications method of claim 1, where the menu and the other menu are not displayed together on a graphical user interface.

7. The electronic communications method of claim 1, where the displaying the meu is based on:
analyzing, by the device, patterns of previous electronic inputs to determine which types of displayed menu information results in less time being used to input the electronic information.

8. The electronic communications method of claim 7, where the analyzing the patterns of previous electronic inputs changes the displayed menu information.

9. The electronic communications method of claim 1, further comprising:
displaying, by the device, a light based on an input being sent from one of the multiple sub-areas.

10. The method of claim 1, where a combination of the multiple sub-areas is not designed as a QWERTY keyboard but inputs into one or more of the multiple sub-areas provide the same input and output features of the QWERTY keyboard, and where inputting particular information via the multiple sub-areas requires less time than if the particular information was inputted into the QWERTY keyboard.

11. A device, comprising:
one or more processors to:
receive electronic information,
where the electronic information is received via inputs through one or more sub-areas,
where the one or more sub-areas is different from a touchscreen associated with the device,
display a first menu, based on receiving the electronic information;
receive additional electronic information,
where the additional electronic information is received via different inputs through one or more sub-areas which make up a keyboard, and wherein the one- or more sub-areas have bumps,
where a time period between receiving the electronic information and the additional electronic information is less than another time period between receiving the electronic information and the additional electronic information by using a standard keyboard without the bumps;

analyze the electronic information and the additional electronic information and determine a pattern associated with the additional electronic information and the electronic information; and display a second menu on the touchscreen associated with the device, based on determining the pattern.

12. The device of claim 11, where the first menu includes selections that are different from other selections associated with the second menu.

13. The device of claim 12, where the bumps are raised at a different height than the rest of the one or more sub-areas, and wherein each of the bumps are different in shape.

14. The device of claim 13, where a portion of the bumps are of an irregular shape.

15. The device of claim 12, where a combination of the one or more sub-areas is not designed as a QWERTY keyboard but inputs into one or more of the multiple sub-areas to provide the same input and output features of the QWERTY keyboard.

16. The device of claim 12, wherein the device includes a light emitting diode.

17. The device of claim 12, wherein each of the one or more sub-areas have borders.

18. The device of claim 17, wherein the borders are raised above portions of each of the one or more sub-areas.

19. The device of claim 12, wherein the device includes:
a tactile switch,
a motion sensor, and
a haptic controller.

20. The device of claim 11, where the first menu includes a selection that is associated with a particular sub-area of the one or more sub-areas.

* * * * *